(12) United States Patent
Miyanari

(10) Patent No.: US 7,920,204 B2
(45) Date of Patent: Apr. 5, 2011

(54) IMAGE CAPTURE APPARATUS AND CONTROL METHOD THEREOF

(75) Inventor: Hiroshi Miyanari, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 594 days.

(21) Appl. No.: 12/028,338

(22) Filed: Feb. 8, 2008

(65) Prior Publication Data

US 2008/0284873 A1 Nov. 20, 2008

(30) Foreign Application Priority Data

Mar. 5, 2007 (JP) ................................ 2007-054889

(51) Int. Cl.
| | |
|---|---|
| *G03B 7/00* | (2006.01) |
| *H04N 5/235* | (2006.01) |
| *H04N 5/238* | (2006.01) |
| *H04N 3/14* | (2006.01) |
| *H04N 5/335* | (2011.01) |

(52) U.S. Cl. ......................... 348/362; 348/296; 348/364

(58) Field of Classification Search .......... 348/296–297, 348/229.1, 362–364; 396/213
See application file for complete search history.

(56) References Cited

U.S. PATENT DOCUMENTS

| | | | | |
|---|---|---|---|---|
| 6,106,165 A | * | 8/2000 | Tanabe | 396/471 |
| 7,656,457 B2 | * | 2/2010 | Ojima et al. | 348/362 |
| 7,667,764 B2 | * | 2/2010 | Kamon et al. | 348/364 |
| 7,667,765 B2 | * | 2/2010 | Turley et al. | 348/364 |
| 2004/0165091 A1 | * | 8/2004 | Takemura et al. | 348/296 |

FOREIGN PATENT DOCUMENTS

| | | |
|---|---|---|
| JP | 11-041523 A | 2/1999 |
| JP | 11041523 | * 12/1999 |
| JP | 2001-235779 | 8/2001 |

* cited by examiner

*Primary Examiner* — Jason Chan
*Assistant Examiner* — Pritham Prabhakher
(74) *Attorney, Agent, or Firm* — Cowan, Liebowitz & Latman, P.C.

(57) ABSTRACT

The image capture apparatus changes a time from the commencement of the operation of the accumulation of the electrical charge to the shuttering, by the shutter blade unit, of the pixel within the image capture element by way of the reset operation in a state of retracting the shutter blade unit from the light path of the image capture element.

9 Claims, 16 Drawing Sheets

FIG. 11
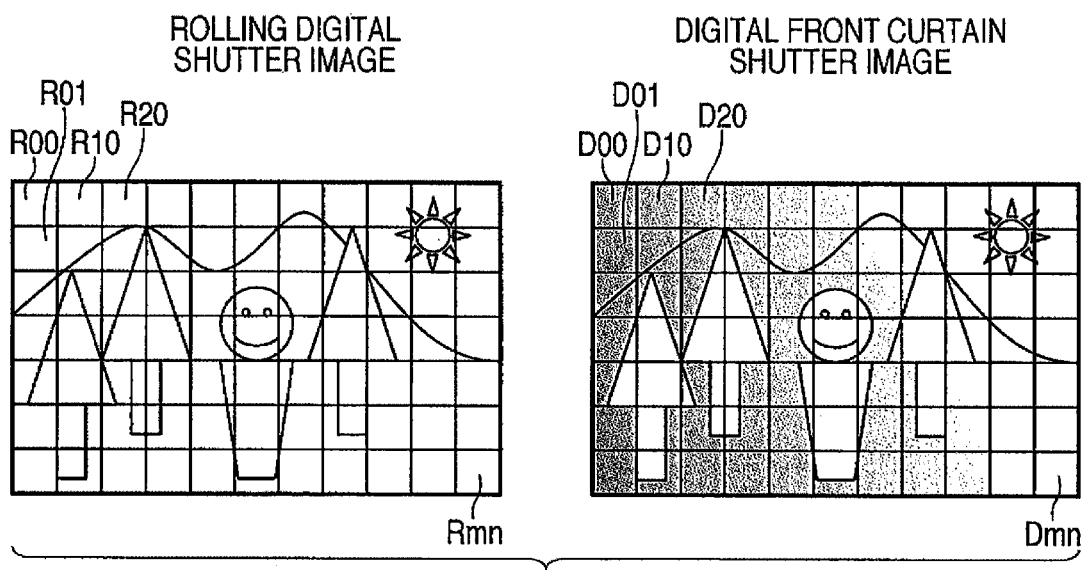
$$Gmn = \left(1 \Big/ \frac{(\text{PIXEL VALUE OF DIGITAL FRONT CURTAIN SHUTTER DMN IMAGE }/Td)}{(\text{PIXEL VALUE OF ROLLING DIGITAL SHUTTER IMAGE RMN }/Tr)}\right)$$
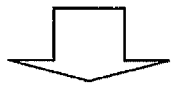
GAIN COMPENSATION VALUE Gmn FIG. 16
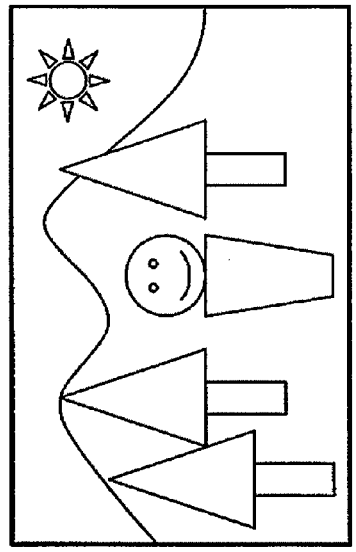
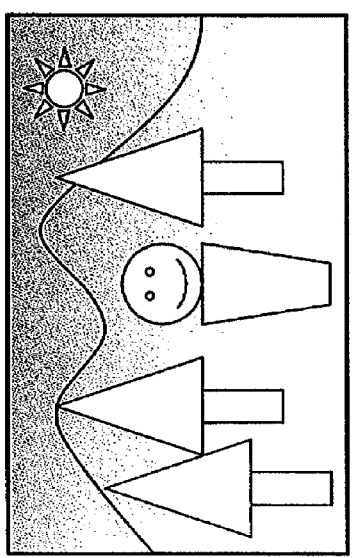

IMAGE CAPTURE APPARATUS AND CONTROL METHOD THEREOF

BACKGROUND OF THE INVENTION

1. Field of the Invention

The present invention relates to an image capture technology that comprises an optical viewfinder mode, which employs an optical finder to observe a subject of an image, and an electronic viewfinder mode, which employs a display unit to observe the subject of the image.

2. Description of the Related Art

A conventional image capture apparatus comprises an optical viewfinder mode, which employs an optical viewfinder to observe a subject of an image, and an electronic viewfinder mode, which employs a display unit to observe the subject of the image. The electronic viewfinder mode retracts a first shutter blade from a light path of an image capture element, and captures an image of a subject upon the image capture element. In such a circumstance, a yoke adhesion surface of a magnet for controlling the first shutter blade is in an exposed state until after a photograph is taken, whereupon it is transitioned to an original position. Accordingly, when a photographer takes time to decide upon a composition, an amount of time wherein the yoke adhesion surface of the magnet for controlling the first shutter blade is in the exposed state increases. As a result, a problem arises wherein a timing precision of the shutter may deteriorate, and may become incapable of properly maintaining an armature, owing to dirt, dust, or other debris infiltrating the yoke adhesion surface of the magnet for controlling the first shutter blade, and consequently impeding the adhesion of the first shutter blade.

In response thereto, Japanese Patent Laid Open No. 11-041523 discloses a technology wherein the shutter unit comprises only a rear shutter blade as a shutter blade unit, and that controls an exposure time of an image capture element that uses an X-Y address scheme by aligning a commencement of an accumulation of an electric charge of the image capture element with a travel characteristic of the rear shutter blade. The technology disclosed in Japanese Patent Laid Open No. 11-041523 does not, however, take into consideration a change in the travel characteristic of the shutter blade unit, which may arise as a result of, for example, a change in an attitude of the camera, or a temperature of an environment wherein the camera is being used. As a consequence, a lack of uniformity of the exposure time, under such a circumstance as when a fast shutter speed is set, will have an increasingly significant effect. The lack of uniformity of the exposure time will also have an increasingly significant effect when an effect of such as the temperature of the environment wherein the camera is being used with regard to a reset operation of the image capture element and the rear shutter blade varies significantly, when controlling the commencement of the exposure via the reset operation of the image capture element.

In response thereto, Japanese Patent Laid Open No. 2001-235779 discloses a technology wherein a photo refractor is employed to detect a difference in a travel characteristic of a first shutter blade as the shutter blade unit and the travel characteristic of a rear shutter blade as the shutter blade unit, and a result of the detection thereof is taken into account in a following driving of the shutter blade unit.

A configuration that is disclosed in Japanese Patent Laid Open No. 2001-235779 is capable, however, of detecting the travel characteristic of the shutter blade unit only when the rear shutter blade as the shutter blade unit is actually being made to travel. As a consequence, the result of the detection thereof would be taken into account in a photograph after the following photograph. Accordingly, a problem arises whereby no guarantee exists that a photograph that is taken subsequent to the detection of the travel characteristic of the shutter blade unit will be taken under a condition that is identical to a condition that applies when the travel characteristic of the shutter blade unit is detected, owing to a plurality of such various factors as the attitude of the camera, the temperature or a humidity of the environment wherein the camera is being used, a state of a power supply, a number of operations that have been performed, or an interval between one photograph being taken and a following photograph being taken.

SUMMARY OF THE INVENTION

The present invention was devised with the problems in mind, and has an objective to compensate, in an effective manner, for a misalignment in the exposure time of the image capture element.

It is a first aspect of the present invention, with regard to an image capture apparatus, to comprise an image capture unit that comprises a plurality of pixels, uses the plurality of pixels to photoelectrically convert an image of a subject and accumulates an electric charge therefrom, and outputs the electric charge thus accumulated as an image signal, a shutter unit that causes a shutter blade that shutters the plurality of pixels to travel, a first control unit that resets the plurality of pixels in a state wherein the shutter unit is retracted from a light path of the image capture unit, commences the accumulation of the electric charge with regard to each respective pixel, and reads out a first pixel signal from the plurality of pixels after a first accumulation time, a second control unit that resets the plurality of pixels in a state wherein the shutter unit is retracted from a light path of the image capture unit in coordination with a travel characteristic of the shutter blade when the shutter blade is retracted by the first control, and, after a second accumulation time, causes the shutter blade unit to travel to shutter the plurality of pixels and reads out a second pixel signal from the plurality of pixels, and a correction unit that performs a gain correction of the second image signal by computing a ratio between a pixel value of the first image signal and a pixel value of the second image signal, and multiplying a result thereof by the pixel value of the second image signal.

It is a second aspect of the present invention, with regard to a control method of an image capture apparatus that comprises an image capture unit that comprises a plurality of pixels, uses the plurality of pixels to photoelectrically convert an image of a subject and accumulates an electric charge therefrom, and outputs the electric charge thus accumulated as an image signal, and a shutter unit that causes a shuttering in a shutter blade that shutters the plurality of pixels to travel, the control method comprising the steps of resetting the plurality of pixels in a state wherein the shutter unit is retracted from a light path of the image capture unit, commencing the accumulation of the electric charge with regard to each respective pixel, and reading out a first pixel signal from the plurality of pixels after a first accumulation time, resetting the plurality of pixels in a state wherein the shutter unit is retracted from a light path of the image capture unit in coordination with a travel characteristic of the shutter blade when the shutter blade is retracted by the first control step, and, after a second accumulation time, causing the shutter blade to travel to shutter the plurality of pixels and reading out a second pixel signal from the plurality of pixels, and performing a gain correction of the second image signal by computing a ratio between a pixel value of the first image signal and a pixel value of the second image signal, and multiplying a result thereof by the pixel value of the second image signal.

Further features of the present invention will become apparent from the following description of exemplary embodiments (with reference to the attached drawings).

BRIEF DESCRIPTION OF THE DRAWINGS

FIG. 11 schematically illustrates a gain correction according to a preferred embodiment of the present invention.

FIG. 16 employs the gain correction value in a vertical direction that was derived in FIG. 15 to schematically illustrate a gain correction value with regard to a vertical direction.

DESCRIPTION OF THE EMBODIMENTS

The following is a description of preferred embodiments of the present invention, with reference to the attached drawings. While the description hereinafter cites a digital single lens reflex (SLR) camera as an example of an image capture apparatus, the present invention is not restricted thereto. It would be possible to apply the present invention to an image capture apparatus comprising a different configuration, provided that the image capture apparatus comprises an image capture element that outputs an image data as an electrical signal, and employs a shutter blade unit as a shuttering component to control an exposure time of the image capture element.

Figure 1:
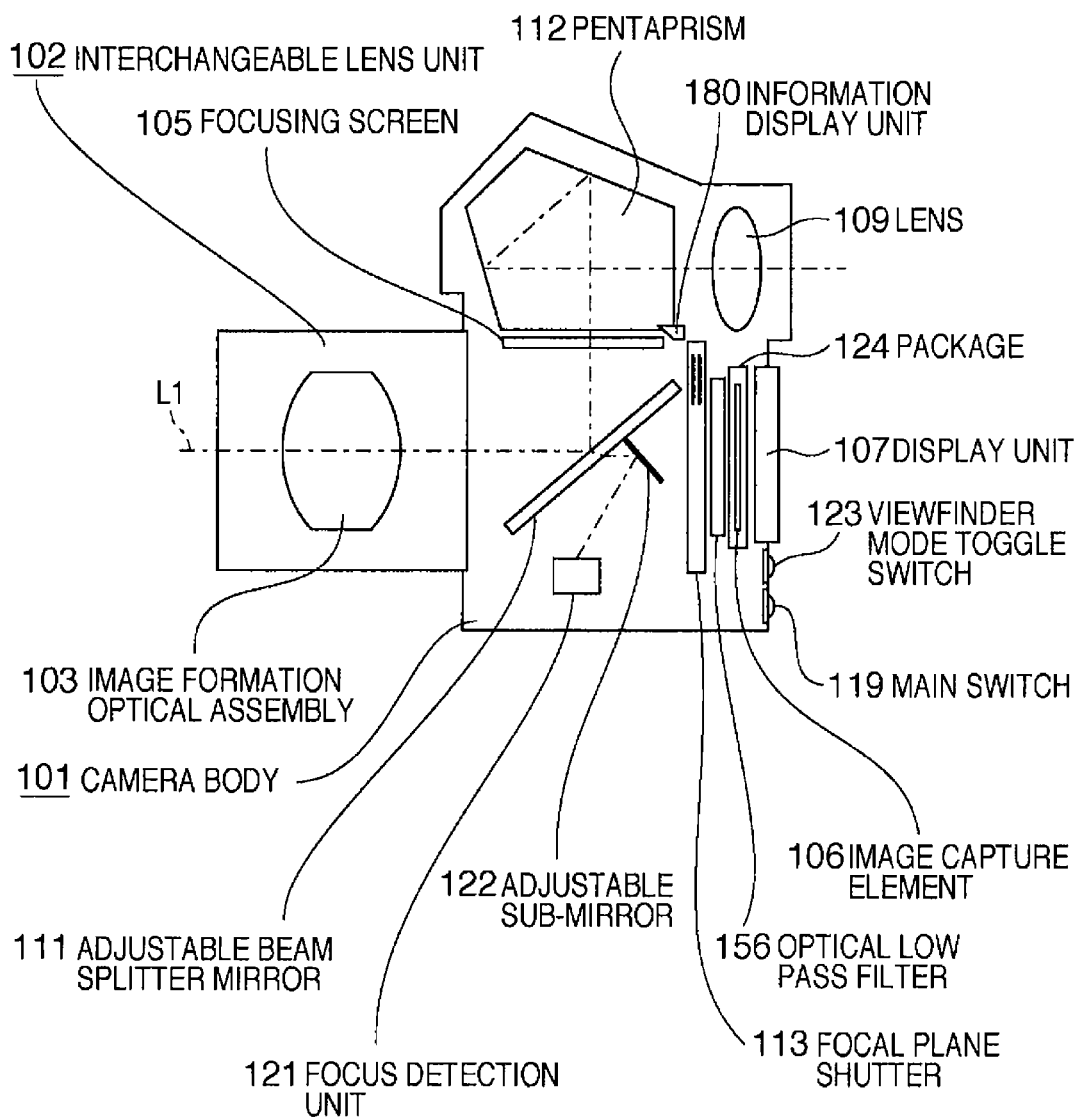
FIG. 1 is a sectional view that illustrates a schematic configuration of an image capture apparatus according to a preferred embodiment of the present invention.
Figure 2:
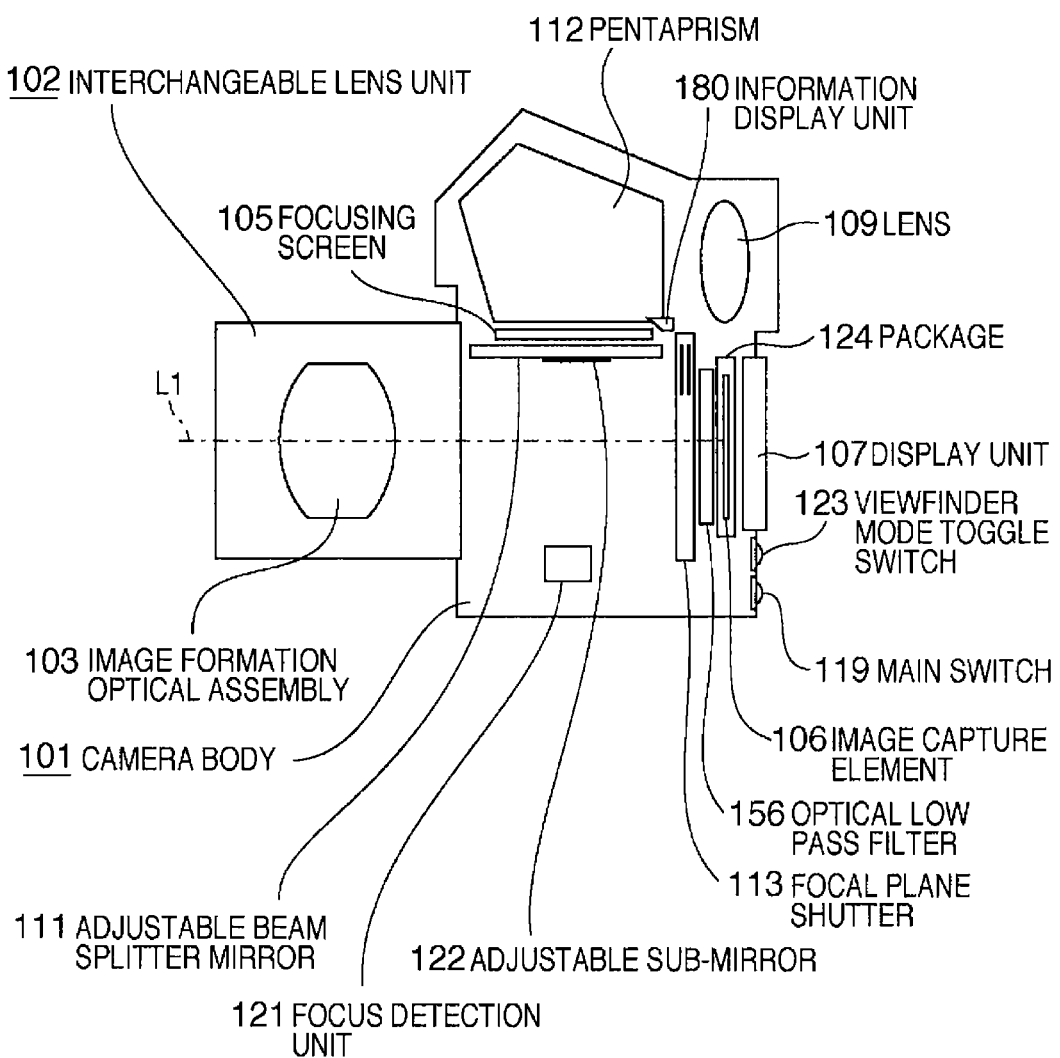
FIG. 2 is a sectional view that illustrates a schematic configuration of an image capture apparatus according to a preferred embodiment of the present invention.

FIG. 1 and FIG. 2 are sectional views that illustrate a schematic configuration of an image capture apparatus according to a preferred embodiment of the present invention. FIG. 1 illustrates a state when an optical viewfinder is employed to observe an image of a subject, and FIG. 2 illustrates a state when a rear mounted liquid crystal display monitor is employed to observe the image of the subject.

Reference numeral 101 is a camera body. Reference numeral 102 is an interchangeable lens unit, which may be attached to, and detached from, the camera body 101, and which is connected electrically and mechanically to the camera body 101 by way of a commonly known mounting mechanism. Replacing the interchangeable lens unit 102 allows obtaining a photographic image with a different angle of field. The interchangeable lens unit 102 adjusts a state of focus thereof by causing an image formation optical assembly 103, which is housed within the interchangeable lens unit 102, to traverse in a direction of an optical axis L1. An infrared cut filter is formed of the image formation optical assembly 103.

Reference numeral 106 is a CMOS process-compatible image sensor (hereinafter "CMOS sensor"), which is one of an image capture element that is housed within a package 124. The CMOS sensor is capable of randomly accessing an arbitrary pixel, simplifying a thinning reading out of an image to be displayed on a display unit 107 (to be described hereinafter), thus allowing a reading out of an image to be performed at a high frame rate.

Reference numeral 156 is an optical low pass filter, which is placed within a light path that ranges from the image formation optical assembly 103 and the image capture element 106, and which is configured so as not to transmit a spatial frequency component within the image of the subject that is higher than necessary.

Reference numeral 107 is a display unit, which is configured of a liquid crystal display monitor that is mounted in a rear surface of the camera body 101. The image data of the subject that is captured by the image capture element 106 is displayed on the display unit 107.

Reference numeral 111 is an adjustable beam splitter mirror, which is for splitting a beam of light that is received from the image formation optical assembly 103 and directing a portion thereof to an optical viewfinder. Reference numeral 105 is a focusing screen, which is positioned in an expected image forming surface of the subject of the photograph, and reference numeral 112 is a pentaprism.

Reference numeral 109 is a lens for observing the subject image that is projected onto the focusing screen 105. The focusing screen 105, the pentaprism 112, and the lens 109 configure a viewfinder optical assembly. An adjustable sub-mirror 122, which is placed at the rear of the beam splitter mirror 111, diverts, to a focus detection unit 121, a beam of light from among the beam of light that passes through the beam splitter mirror 111 that is close to the light path. The focus detection unit 121 performs a phase difference detection scheme focus detection.

A light path division unit that is configured of the beam splitter mirror 111 and the sub-mirror 122 is capable of selectively taking either a first state that is illustrated in FIG. 1 or a second state that is illustrated in FIG. 2. In the first state, the light path division unit divides the light beam from the image formation optical assembly 103 and directs a light beam thus divided to the viewfinder optical assembly, while directing the rest of the light beam to the focus detection unit 121. In the second state, the light path division unit directs the light beam as is, without dividing, from the image formation optical assembly 103 to the image capture element 106. A mirror drive mechanism (not shown), which is configured of an electromagnetic motor and a gear array, changes the position of the beam splitter mirror 111 and the sub-mirror 122, thus switching between the first state and the second state of the light path division unit that is configured of the beam splitter mirror 111 and the sub-mirror 122. The first state is set when employing the optical viewfinder to observe the subject image. The second state is set, when observing the subject with the display unit 107, when employing the image capture element 106 either to perform a focus detection operation or a light metering operation, or to capture a video movie.

Reference numeral 113 is a focal plane shutter as a shutter unit, and reference numeral 119 is a main switch for switching a power supply of the camera body on and off. Reference numeral 123 is a viewfinder mode toggle switch for switching between whether to employ the optical viewfinder or the display unit 107 to observe the subject. Hereinafter, the setting that employs the optical viewfinder to observe the subject will be referred to as "the optical viewfinder mode," and the setting that employs the display unit 107 to observe the subject will be referred to as "the electronic viewfinder mode." Reference numeral 180 is an information display unit for displaying a photograph parameter, such as a shutter speed or an aperture value, when employing the optical viewfinder to observe the subject.

A digital camera comprising an electronic viewfinder function is capable of applying a greater variety of shutter units than is a camera comprising only an optical viewfinder function. An embodiment is conceivable wherein, for example, a focal plane shutter unit is applied that comprises a front curtain and a rear curtain that is employed with a silver salt film camera.

The focal plane shutter unit comprises two shutter blade units that support the shutter plate. The respective shutter blade units use two arms to maintain a group of curtain shutter leaves that are divided into a plurality of blades such that each such shutter blade unit is respectively rotatable, forming a parallel link. One shutter blade unit functions as a first shutter blade, which is also referred to as a front curtain, and which transitions the shutter aperture from a closed state to an open state at time of exposure. The other shutter blade unit functions as a rear shutter blade, which is also referred to as a rear curtain, and which transitions the shutter aperture from the open state to the closed state at time of exposure. The shutter blade units that configure the first shutter blade unit and the rear shutter blade unit are respectively linked to a drive power source, such as a spring that applies a force in a prescribed direction, and a drive component that comprises an armature that is maintained in adherence to a magnet for controlling the respective shutter blade units.

The shutter blade unit that configures the first shutter blade is moved, prior to a photograph being taken, to a position for preparing to take a photograph, by way of a charge lever (not shown), wherein the armature of the drive component comes into contact with the yoke adhesion surface of the magnet for controlling the first shutter blade, and the shutter aperture is maintained in the closed state. The shutter blade unit that configures the rear shutter blade unit is moved, prior to a photograph being taken, to a position for preparing to take a photograph, by way of a charge lever (not shown), wherein the armature of the drive component comes into contact with the yoke adhesion surface of the magnet for controlling the rear shutter blade unit, and the shutter aperture is maintained in the open state.

Operating a shutter switch (not shown) causes the charge lever to retract the shutter blade unit from the position that maintains the contact with the yoke adhesion surface. Each respective shutter blade unit is maintained in the state wherein the armature adheres to the yoke adhesion surface of the magnet for controlling the shutter blade, by way of a magnetism of the magnet for controlling the shutter blade, wherein an electrical current is supplied to a coil that is dedicated thereto. The electrical current that is supplied to the magnet for controlling the first shutter blade, which corresponds to the shutter blade unit that configures the first shutter blade, is interrupted, and the first shutter blade opens the shutter aperture. After a time that is set based on the shutter speed has passed, the electricity that is supplied to the magnet for controlling the rear shutter blade, which corresponds to the shutter blade unit that configures the rear shutter blade, is interrupted, and the rear shutter blade closes the shutter aperture. When the travel of the rear shutter blade unit is completed, the respective shutter blade units move once again to the position in preparation for taking the photograph, by way of the charge lever (not shown), and stand by until the next photograph is to be taken.

Figure 3:
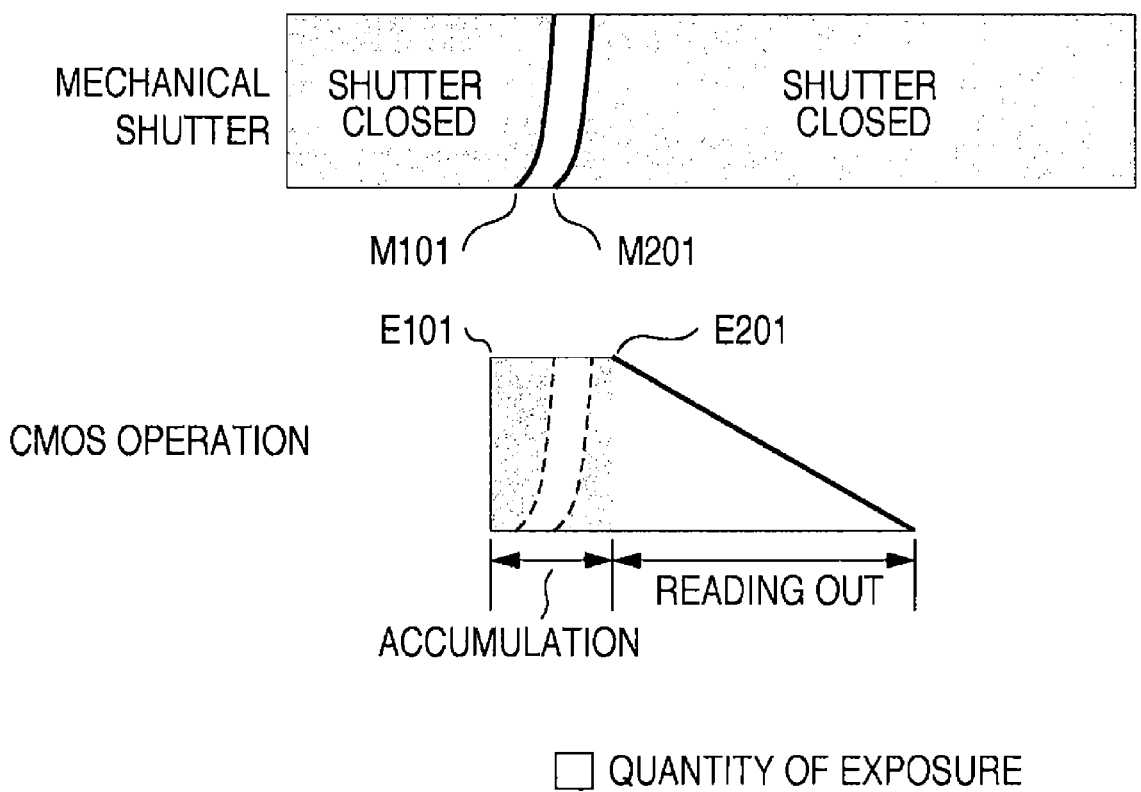
FIG. 3 illustrates an accumulation operation of a conventional image capture element and a travel timing of a conventional shutter blade unit.

FIG. 3 illustrates an accumulation operation of a conventional image capture element and a travel timing of a conventional first shutter blade and a conventional rear shutter blade of a shutter unit. A horizontal axis represents a time, and a vertical axis denotes a position of an image capture region of the image capture element in a vertical direction, which is to say, a position with regard to travel direction of the shutter blade unit. Reference numeral M1101 denotes a position of a point of a formation of a slit of a rearmost part of the first shutter blade, which functions as a position for commencing the exposure, and reference numeral M1201 denotes a position of a point of a formation of a slit of a frontmost part of the rear shutter blade, which functions as a position for commencing the shuttering of the exposure. Reference numeral E1101 denotes a timing of a reset operation for commencing an accumulation of the image capture element, and reference numeral E1201 denotes a timing of a read out operation for obtaining a signal that corresponds to an electrical charge that is accumulated in the image capture element. The image capture element commences the accumulation operation prior to the first shutter blade of the shutter unit commencing the travel, and performs the read out operation of the image capture element after both the first shutter blade and the rear shutter blade have completed the respective travel. The interval wherein the image capture element performs the accumulation operation is encompassed within the interval wherein both the first shutter blade and the rear shutter blade travel.

Figure 4:
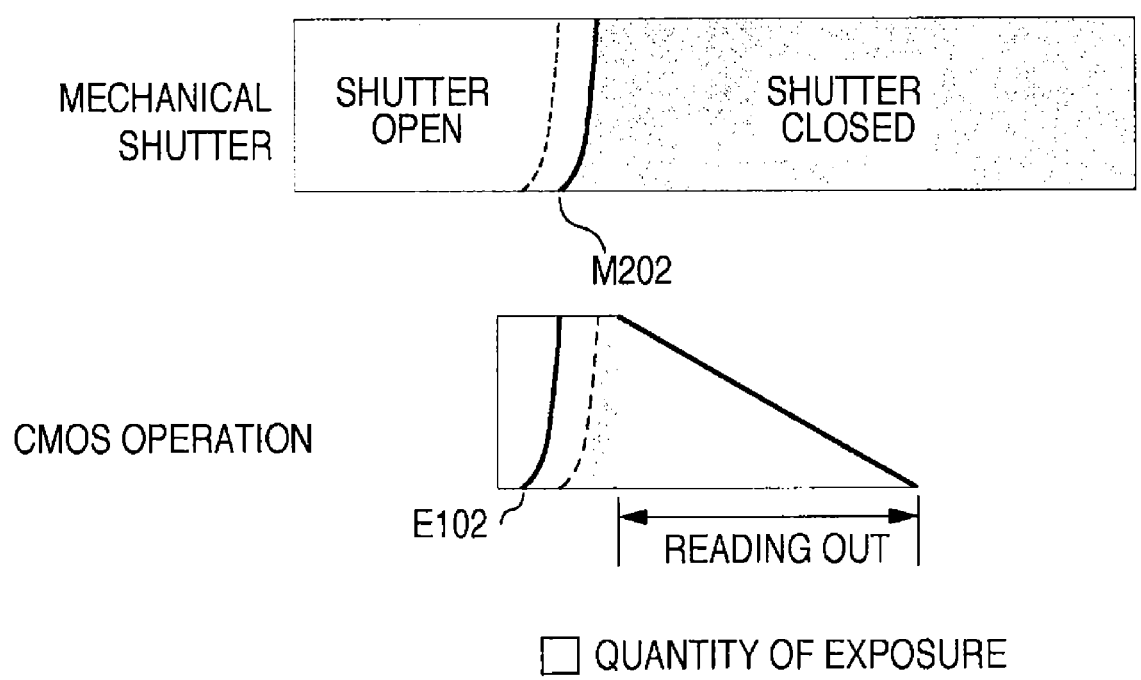
FIG. 4 illustrates an accumulation operation of a conventional image capture element and a travel timing of a conventional shutter blade unit.

FIG. 4 illustrates an accumulation operation of a conventional image capture element and a travel timing of a conventional rear shutter blade of the shutter unit. Reference numeral M1202 denotes a position of a point of a formation of a slit of a frontmost part of the rear shutter blade, which functions as a position for commencing the shuttering of the exposure. Reference numeral E1102 denotes a timing of a reset operation for commencing an accumulation of the image capture element, and reference numeral E1202 denotes a timing of a read out operation for obtaining a signal that corresponds to an electrical charge that is accumulated in the image capture element. The image capture element commences the accumulation operation before a specified time prior even to the rear shutter blade of the shutter unit commencing the travel, in accordance with the set shutter speed. The timing of the commencement of the accumulation operation is controlled on a per line basis of the image capture element, in conjunction with the travel characteristic of the rear shutter blade, which accelerates as it travels, in order that a quantity of the exposure is uniform across all regions. The image capture element performs the read out of the accumulated electrical charge after the rear shutter blade as the shutter blade unit has completed the travel.

Under the conventional method illustrated in FIG. 3 and FIG. 4, an irregularity in an exposure may potentially occur in an image that is photographed with an electronic front curtain shutter, given that the travel characteristic of the shutter blade unit of the mechanical rear curtain shutter changes in response to a plurality of factors, such as the attitude of the camera, the temperature or a humidity of the environment wherein the camera is being used, a state of a power supply, a number of operations that have been performed, or an interval between one photograph being taken and a following photograph being taken.

In response thereto, the present invention is capable of suppressing an irregularity in an exposure, with regard to an image that is photographed with an electronic shutter, by performing a gain correction of an image that is obtained via the electronic front curtain shutter photography, in accordance with an image that is photographed with a rolling electronic shutter (to be described hereinafter).

Figure 5:
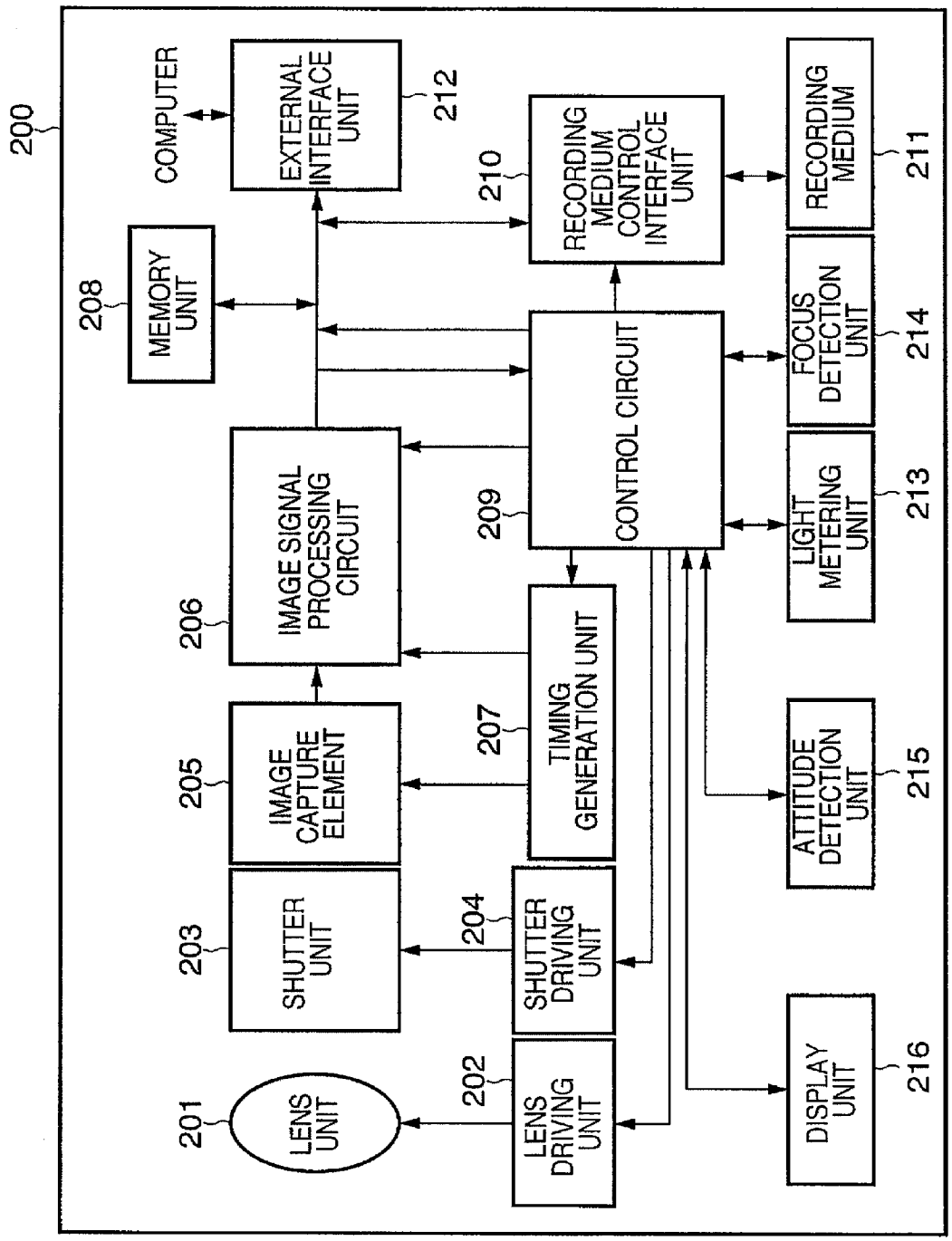
FIG. 5 is a block diagram that illustrates a schematic configuration of an image capture apparatus according to a preferred embodiment of the present invention.

FIG. 5 is a block diagram that illustrates a configuration of an image capture apparatus 200 according to a preferred embodiment of the present invention.

Reference numeral 201 is a lens unit, which incorporates the image formation optical assembly 103, and reference numeral 202 is a lens driving unit. Such an operation as a zoom control or a focus control is performed by the lens driving unit 202 causing to move a zoom optical assembly (not shown), as well as the image formation optical assembly 103, which are incorporated within the lens unit 201. Reference numeral 203 is a shutter unit as a shutter unit, comprising a shutter blade unit that corresponds to a rear shutter blade of a focal plane shutter unit. Reference numeral 204 is a shutter driving unit for driving the shutter unit 203, and the shutter driving unit 204 is configured of the charge lever and the magnet for controlling the shutter blade unit.

Reference numeral 205 is an X-Y address scheme image capture element, which accumulates an electrical charge in response to a quantity of light by receiving a light beam of an image of a photographic subject, and which generates an image data of the subject in accordance with the electrical charge thus accumulated. The X-Y address scheme image capture element 205 corresponds to the image capture element 106 that is illustrated in FIG. 1 and FIG. 2. Turning to a description of a scan method of the X-Y address scheme image capture element 205, first, a scan is executed, on a per pixel or a per line basis of the image capture element 205, which erases an unnecessary electrical charge from the electrical charge that has been accumulated by the image capture element 205 (hereinafter "the reset operation"). Next, the accumulation operation is concluded by performing a read out scan of the signal electrical charge on the per pixel or the per line basis. The image capture element 205 is thus capable of performing the reset scan and the read out scan at a scan timing that varies in accordance with a region of the image capture element 205. Hereinafter, an electronic shutter that performs such an operation will be referred to as a "rolling electronic shutter."

Reference numeral 206 is an image signal processing circuit, which amplifies an image data analog signal that is output by the image capture element 205. The image signal processing circuit 206 also performs an A/D conversion process that converts the image data from an analog signal to a digital signal, executes each respective type of correction process after the A/D conversion, and executes a compression process upon the image data.

Reference numeral 207 is a timing generation unit, which outputs a timing signal to the image capture element 205 and the image signal processing circuit 206, and reference numeral 208 is a memory unit for temporarily storing the image data. Reference numeral 209 is a control circuit for controlling the image capture apparatus 200 overall, or for calculating a photography parameter or a coefficient of the image data correction process. Reference numeral 210 is a recording medium control interface unit for performing a recording of the image data to a recording medium 211, or for performing a read out of the image data from the recording medium 211. Reference numeral 211 is a recording medium that may be attached to, and detached from, the camera, such as a semiconductor memory, for performing a recording or a reading out of the image data, and reference numeral 212 is an external interface unit for communicating with, for example, an external computer.

Reference numeral 213 is a light metering unit, which is positioned in proximity to the pentaprism 112, and which employs the light beam that penetrates the optical viewfinder when the optical viewfinder mode is in use to measure a brightness of the subject. Reference numeral 214 is a focus detection unit, which employs the light beam that is reflected by the beam splitter mirror 111 and the sub-mirror 122 to detect a focus state of the subject, and which corresponds to the focus detection unit 121 that is illustrated in FIG. 1 and FIG. 2. Reference numeral 215 is an attitude detection unit that employs a gravitic sensor to detect an orientation of the camera body. Reference numeral 216 is a display unit, which is for displaying a subject as a moving image when using the electronic viewfinder mode, or for displaying an image that is photographed, and which corresponds to the display unit 107 that is illustrated in FIG. 1 and FIG. 2.

Figure 6:
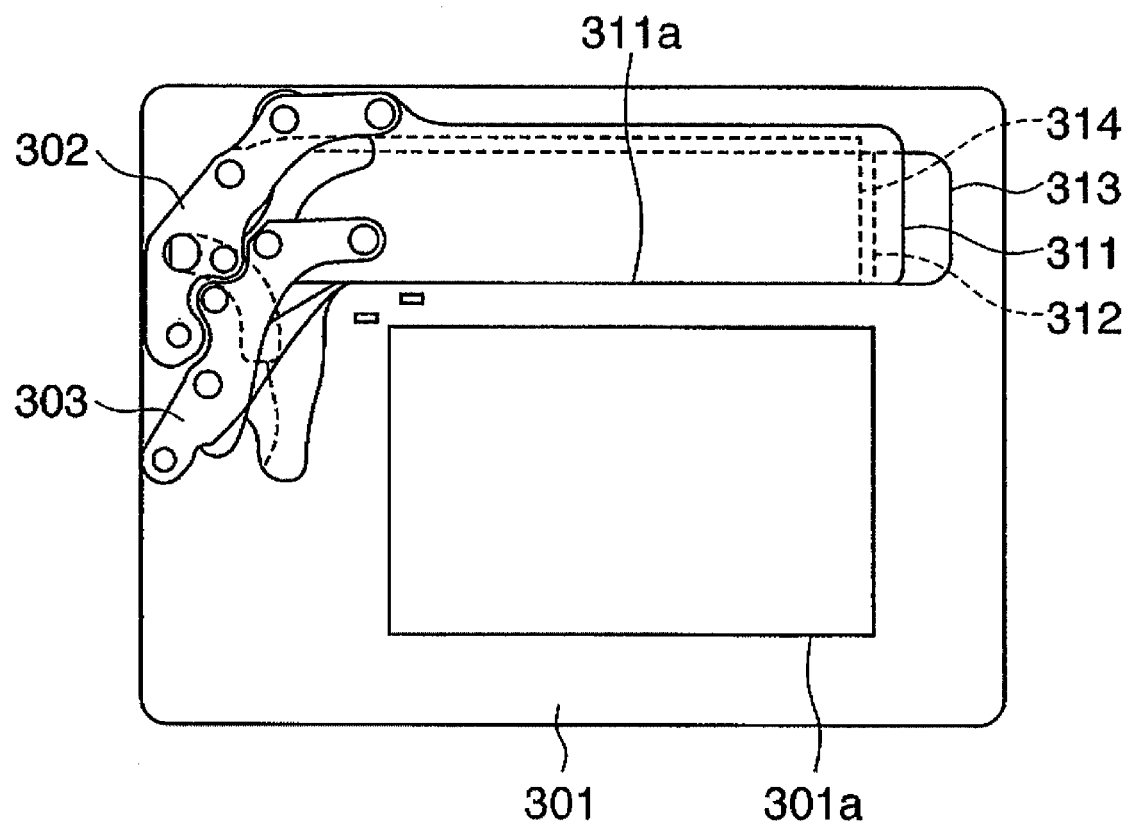
FIG. 6 illustrates a schematic configuration of a shutter unit according to a preferred embodiment of the present invention.

FIG. 6 illustrates a schematic configuration of the shutter unit 203. Reference numeral 301 is a shutter baseplate, and reference numeral 301a is a shutter aperture that is formed within the shutter baseplate 301. Reference numeral 302 is a first arm, and reference numeral 303 is a second arm, each of which is placed so as to rotate freely around an axis that is attached to the shutter baseplate 301. Reference numerals 311-314 are the rear shutter blade, which is supported by the dowel that is fitted into the first arm and the dowel that is fitted into the second arm so as to rotate freely with respect to the respective arms. The first arm 302, the second arm 303, and the rear shutter blade as the shutter blade 311-314 configure the shutter blade unit that forms the parallel link.

From the state of being transitioned by the charge lever to the position for preparing to take the photograph, the electrical current to the magnet for controlling the shutter driving unit 204 is interrupted, whereupon the rear shutter blade 311, the rear shutter blade 312, the rear shutter blade 313, and the rear shutter blade 314 commence, in numerical sequence, to close over the shutter aperture 301a. Reference numeral 311a is a point of a formation of a slit that positions a frontmost part of a direction of a progress of the rear shutter blade 311, wherein the electrical charge accumulation in the image capture element 205 (to be described hereinafter) commences), and the time required to close the shutter at the point of the formation of the slit 311a is the exposure time with respect to the present region of the image capture element.

The shutter unit 203 that is described in FIG. 6 and in FIG. 10 (to be described hereinafter) is described with the rear shutter blade being positioned in a lower portion of FIG. 6 when in the position for preparing to take the photograph, with the shutter blade unit transitioning to an upper portion of FIG. 6 when the photograph is taken. For purposes of convenience of description, the rear shutter blade will be described in FIG. 3 and FIG. 4, as well as in FIG. 11 and FIG. 12 (to be described hereinafter), as transitioning from the upper portion of the drawing to the lower portion of the drawing when the photograph is taken.

Figure 7:
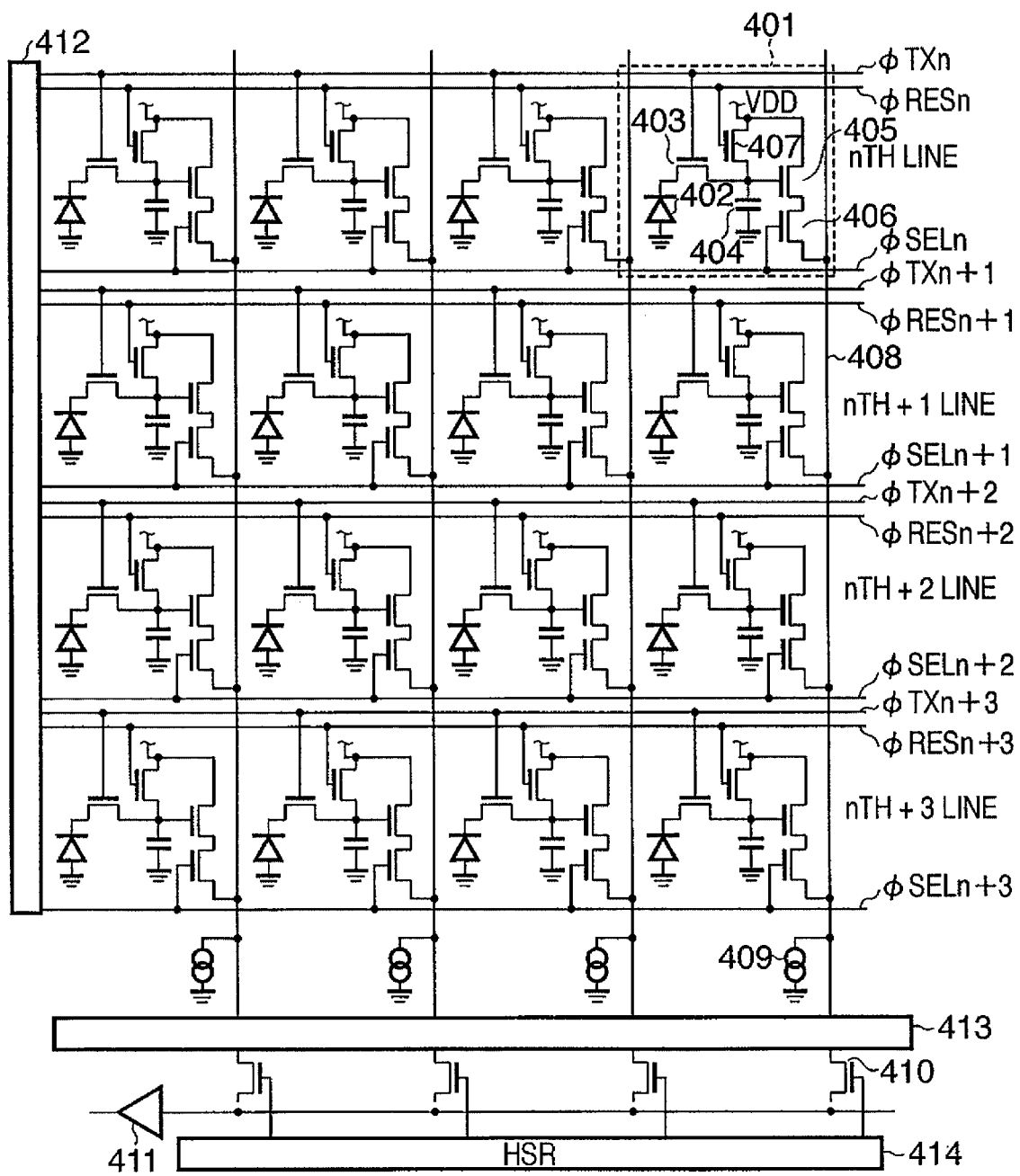
FIG. 7 illustrates a configuration of an image capture element that employs an X-Y address scheme scanning method.
Figure 8:
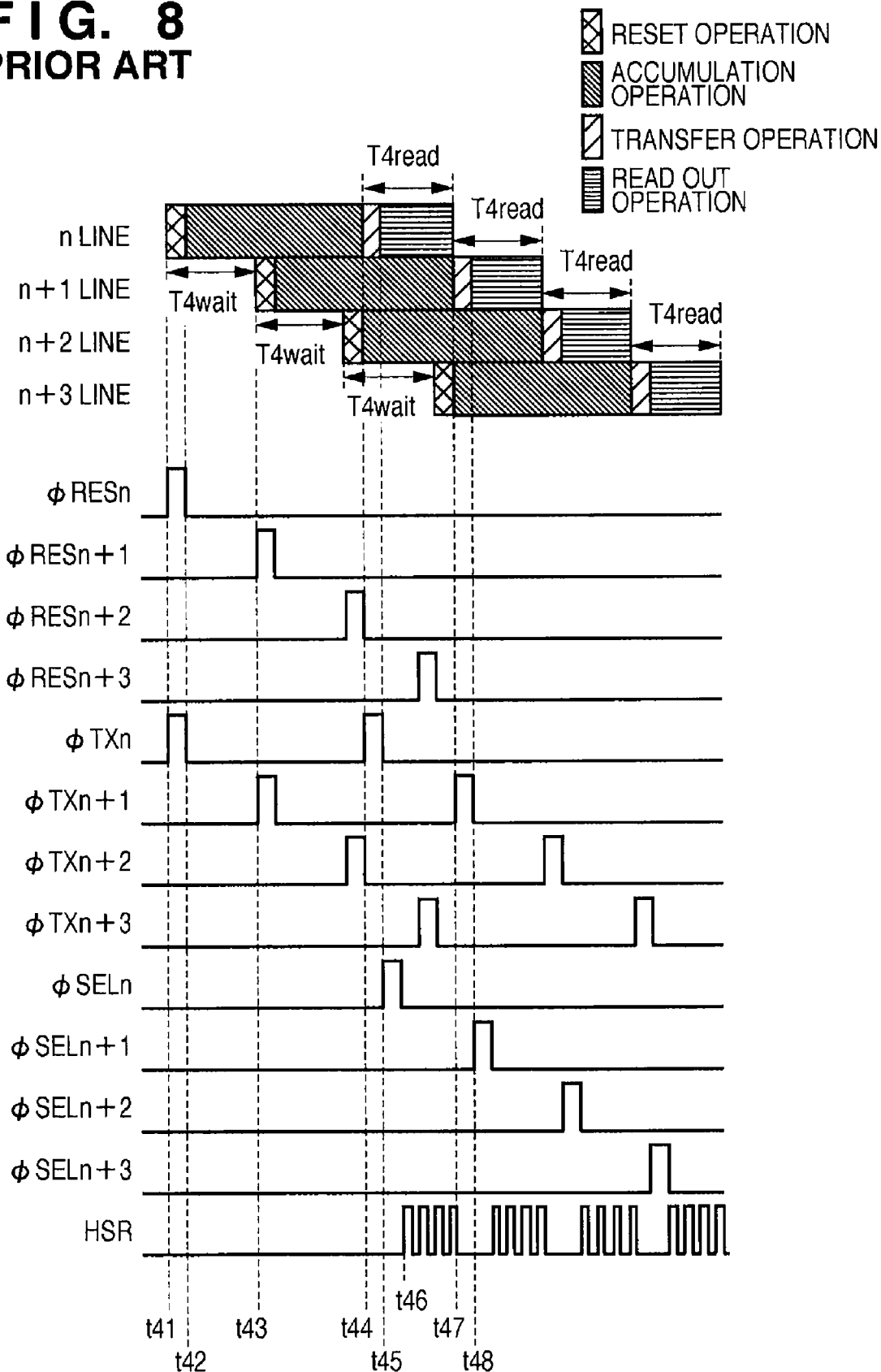
FIG. 8 is a timing diagram that illustrates a drive pulse and a drive sequence with regard to a driving of a conventional rolling electronic shutter.

The following is a description of the configuration and the drive method of the X-Y address scheme image capture element 205 and the operation of the rolling electronic shutter, with reference to FIG. 7 and FIG. 8.

FIG. 7 illustrates a configuration of the image capture element 205 that employs the X-Y address scheme scanning method. Reference numeral 401 is a unit pixel. Reference numeral 402 is a photo diode (hereinafter "PD"), which functions as an photoelectric conversion element that converts light into an electrical charge. Reference numeral 403 is a transfer switch that routes the electrical charge that is generated at the PD 402 by way of a switch pulse φTX to an FD 404 (to be described hereinafter). Reference numeral 404 is an electrical charge detection unit (hereinafter "FD"), which temporarily accumulates the electrical charge, and reference numeral 405 is an MOS amplifier, which functions as a source follower. Reference numeral 406 is a selection switch that selects a pixel by way of a selection pulse φSEL, and reference numeral 407 is a reset switch, which erases the electrical charge that is accumulated in the FD 404, by way of a reset pulse φRES. A floating diffusion amplifier is configured of the FD 404, the MOS amplifier 405, and a constant current power supply 409 (to be described hereinafter). The electrical charge that is selected by the selection switch 406 is converted into a voltage, and output via a signal output line 408 to a read out circuit 413. Reference numeral 409 is a constant current power supply that is an electrical load of the MOS amplifier 405.

Reference 410 is a selection switch for selecting the output signal from the read out circuit 413, and the selection switch 410 is driven by a horizontal scan circuit 414. Reference numeral 412 is a vertical scan circuit for selecting the switch 403, 406, and 407.

Hereinafter, an nth scan line that is scan selected by the vertical scan circuit 412 will be treated as φTX, φRES, and φSEL, respectively, where n is a nonnegative integer.

FIG. 8 is a timing diagram that illustrates a drive pulse and a drive sequence with regard to a driving of a conventional rolling electronic shutter. FIG. 8 illustrates a circumstance from a line n to a line n+3 that are scan selected by the vertical scan circuit 412.

The operation of the rolling electronic shutter commences with an impression of a pulse upon φRESn and φTXn, and the transfer switch 403 and the reset switch 407 being switched on, with regard to the line n from a time t41 to a time t42. The reset operation is performed on the PD 402 and the FD 404 of the nth line, which erases the unnecessary accumulated electrical charge.

When the reset operation is performed, the transfer switch 403 and the reset switch 407 are switched off at the time t42, and the accumulation operation commences, wherein the photoelectrical charge that is generated is accumulated in the PD 402. At a time t44, a pulse is impressed upon φTXn, the transfer switch 403 is switched on, and the transfer operation is performed, wherein the charge that is accumulated in the PD 402 is routed to the FD 404. While it is necessary to switch off the reset switch 407 prior to the transfer operation, the reset switch 407 is switched off simultaneously with the transfer switch 403, at the time t42 in FIG. 8. In the present circumstance, the interval from the time t42 to the time t44 is the accumulation interval.

Upon completion of the transfer operation of the nth line, a pulse is impressed upon φSELn, and the selection switch 406 is switched on, whereupon the electrical charge that is maintained in the FD 404 is converted to an electrical voltage, which is output to the read out circuit 413. The signal that is temporarily maintained in the read out circuit 413 is output in order by the horizontal scan circuit 414, beginning at a time t46. An interval from the commencement of the transfer at the time t44 to the conclusion of the read out at a time t47 is treated as a T4read at the line n, and an interval from the time t41 to the time t43 is treated as a T4wait at a line n+1. The same is true of the other lines, to wit, an interval from the commencement of the transfer to the conclusion of the read out is treated as a T4read, and an interval from the commencement of the reset of a given line to the commencement of the reset of a succeeding line is treated as a T4wait.

In such fashion, while the timing of the accumulation in the upper and the lower regions of the image capture element 205 varies under the conventional rolling electronic shutter operation, it is possible to make the time required for each respective accumulation equivalent for the upper and the lower regions of the image capture element 205.

In response thereto, a preferred embodiment of the present invention involves changing a time from the commencement of the operation of the accumulation of the electrical charge to the shuttering, by the shutter blade unit, of the pixel within the image capture element 205 by way of the reset operation in a state of retracting the shutter blade unit from the light path of the image capture element 205 (to be described hereinafter). The exposure time of the image capture element 205 is controlled thereby. Given such a configuration, an effective exposure time of the image capture element 205 is the time from the commencement of the operation of the accumulation of the electrical charge, by way of resetting the image capture element 205 in the state of retracting the shutter blade unit from the light path of the image capture element 205 to the shuttering, by the shutter blade unit, of the image capture element 205. It is consequently unnecessary to make the time required for each respective accumulation equivalent for the upper and the lower regions of the image capture element 205. According to the embodiment, the reset operation of the PD 402 and the FD 404 of the image capture element 205 is brought in line with the travel characteristic of the rear shutter blade, rather than being performed at an equal interval on a per line basis. In the present circumstance, it is presumed that the travel characteristic of the rear shutter blade refers to a travel position of the rear shutter blade as a function of a passage of time when the rear shutter blade travels.

Figure 9:
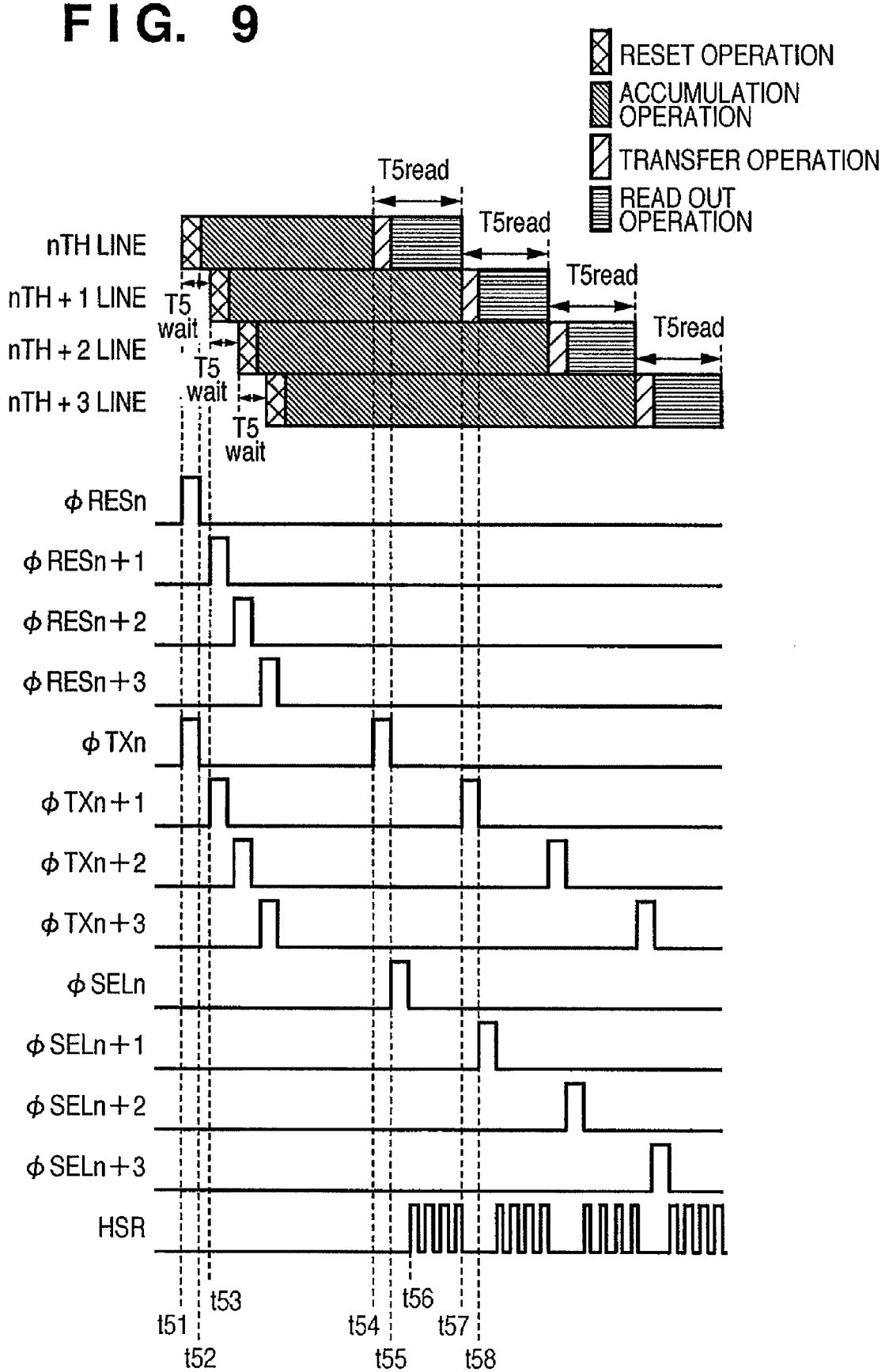
FIG. 9 illustrates a drive pulse and a drive sequence of an image capture element according to a preferred embodiment of the present invention.

FIG. 9 illustrates a drive pulse and a drive sequence of the image capture element according to a preferred embodiment of the present invention. As per FIG. 8, the description according to FIG. 9 also illustrates a circumstance from a line n to a line n+3 that are scan selected by the vertical scan circuit 412.

An electronic front curtain shutter involves beginning with a pulse being impressed upon φRESn and φTXn in an interval between a time t51 and a time t52, and the transfer switch 403 and the reset switch 407 being switched on. The reset operation is performed on the PD 402 and the FD 404 of the nth line, which erases the unnecessary accumulated electrical charge.

The transfer switch 403 is switched off at the time t52, and the accumulation operation commences, wherein the photoelectrical charge that is generated is accumulated in the PD

402. At a time t54, a pulse is impressed upon φTXn, the transfer switch 403 is switched on, and the transfer operation is performed, wherein the charge that is accumulated in the PD 402 is routed to the FD 404. While it is necessary to switch off the reset switch 407 prior to the transfer operation, the reset switch 407 is switched off simultaneously with the transfer switch 403, at the time t52 in FIG. 9. In the present circumstance, the interval from the time t52 to the time t54 is the accumulation interval.

Upon completion of the transfer operation of the nth line, a pulse is impressed upon φSELn, and the selection switch 406 is switched on, whereupon the electrical charge that is maintained in the FD 404 is converted to an electrical voltage, which is output to the read out circuit 413. The signal that is temporarily maintained in the read out circuit 413 is output in order by the horizontal scan circuit 414, beginning at a time t56. An interval from the commencement of the transfer at the time t54 to the conclusion of the read out at a time t57 is treated as a T5read, and an interval from the time t51 to the time t53 is treated as a T5wait. The accumulation operation commences at the time t53, with the line n+1. As with the other lines, an interval from the commencement of the transfer to the conclusion of the read out is treated as a T5read, while an interval T5wait from the commencement of the reset of the PD 402 and the FD 404 of a given line to the commencement of the reset of the PD 402 and the FD 404 of a succeeding line does not correspond to an equivalent time interval. An interval T5wait from the commencement of the reset of the PD 402 and the FD 404 of a given line to the commencement of the reset of the PD 402 and the FD 404 of a succeeding line is presumed to be practically identical for all lines until the rear shutter blade passes. Consequently, the timing is controlled so as to be in line with the travel characteristic of the rear shutter blade.

Even if it is possible, however, to predict, to an extent, the travel characteristic of the rear shutter blade, the travel characteristic thereof changes in response to a plurality of factors, such as the attitude of the camera, the temperature or the humidity of the environment wherein the camera is being used, the state of the power supply, the number of operations that have been performed, or the interval between one photograph being taken and the following photograph being taken, and as a consequence, it is difficult to make the reset operation of the image capture element 205 match the travel characteristic of the rear shutter blade. Hence, according to the embodiment, a process is performed, employing a method to be described hereinafter, that minimizes a misalignment or a lack of uniformity in the exposure time on the per region basis of the image capture element 205.

In the present circumstance, the description is of the operation according to the embodiment when the image capture apparatus 200 is taking a photograph. The following is a description of an example wherein the optical viewfinder mode is set as the viewfinder mode thereof.

When the main switch 119 is operated so as to switch on the power supply, the power supply to the image capture circuit, such as the image signal processing circuit 206 and the timing generation unit 207, is switched on.

When a release button (not shown) is depressed to a given extent, thus issuing a command to the image capture apparatus to enter an operation of preparing to take the photograph, the control circuit 209 causes the light metering unit 213 to perform a light metering and determine the brightness of the subject therefrom. In response to the brightness of the subject thus determined, the control circuit 209 decides on an appropriate shutter speed (hereinafter a "target exposure time") and an appropriate aperture value. Based on the signal that is output by the focus detection unit 214, the control circuit 209 extracts a high frequency component of the image of the subject, and calculates a distance to the subject.

A position of the lens unit 201 within the lens driving unit 202 is adjusted such that the lens unit is driven and the focus state is the object that is determined to be a primary subject of a photograph. When the primary subject of the photograph is the focus state, a user of the camera is notified thereof by a method such as a sound or causing a focus detection frame to light up.

A correction table that stores the plurality of factors, such as the attitude of the camera, the temperature or the humidity of the environment wherein the camera is being used, the state of the power supply, the number of operations that have been performed, or the interval between one photograph being taken and the following photograph being taken, is employed to estimate the travel characteristic of the rear shutter blade that is the shutter blade unit, and calculates the timing of the reset operation on the per line basis of the image capture element 205.

When the release button (not shown) is depressed to a further extent, thus issuing a command to commence taking the photograph, the control circuit 209 raises the light path division unit that is formed from the beam splitter mirror 111 and the sub-mirror 122, adopting the state that is illustrated in FIG. 2.

The travel of the rear shutter blade that is the shutter blade unit is initiated after the reset operation of the image capture element 205 commences and a time interval has passed corresponding to the target exposure time that has been decided upon. The time from the outputting of the signal to the shutter driving unit 204 to commence the travel of the shutter blade unit to the point of the formation of the slit of the rear shutter blade 311 covering the image capture element 205 is also taken into account when deciding upon the timing whereupon the travel of the shutter blade unit commences.

The image capture element 205 performs the read out scan of the electrical charge that is accumulated on the per line basis after the travel of the shutter blade unit is completed and the shutter aperture 301a is completely covered by the rear shutter blade 311-314.

When the viewfinder mode is set as the electronic viewfinder mode, the light path division unit that is configured of the beam splitter mirror 111 and the sub-mirror 122 is raised, adopting the state that is illustrated in FIG. 2, before the release button is depressed to the given extent. The image capture element 205 periodically performs the read out operation, and sequentially displays the image of the subject on the display unit 216. The appropriate shutter speed and the appropriate aperture value are decided upon in accordance with the image data that is obtained from the image capture element 205, and the position of the lens unit 201 within the lens driving unit 202 is adjusted such that the focus state is the object that is determined to be the primary subject of a photograph. The reset operation of the image capture element 205 is performed, and the shutter blade unit is made to travel, in accordance with the timing whereby the release button is depressed to the further extent.

When the photography operation is finished, the image data that is output from the image capture element 205 is amplified, and furthermore, converted from analog to digital, by the image signal processing circuit 206, and thereafter written to the memory unit 208 by the control circuit 209.

A gain correction (to be described hereinafter) is thereafter performed upon the image data that is accumulated in the memory unit 208, by the control circuit 209. The image data whereupon the gain correction has been performed is recorded on the recording medium that may be attached to, and detached from, the recording medium 211 by way of the recording medium control interface unit 210.

Figure 10:
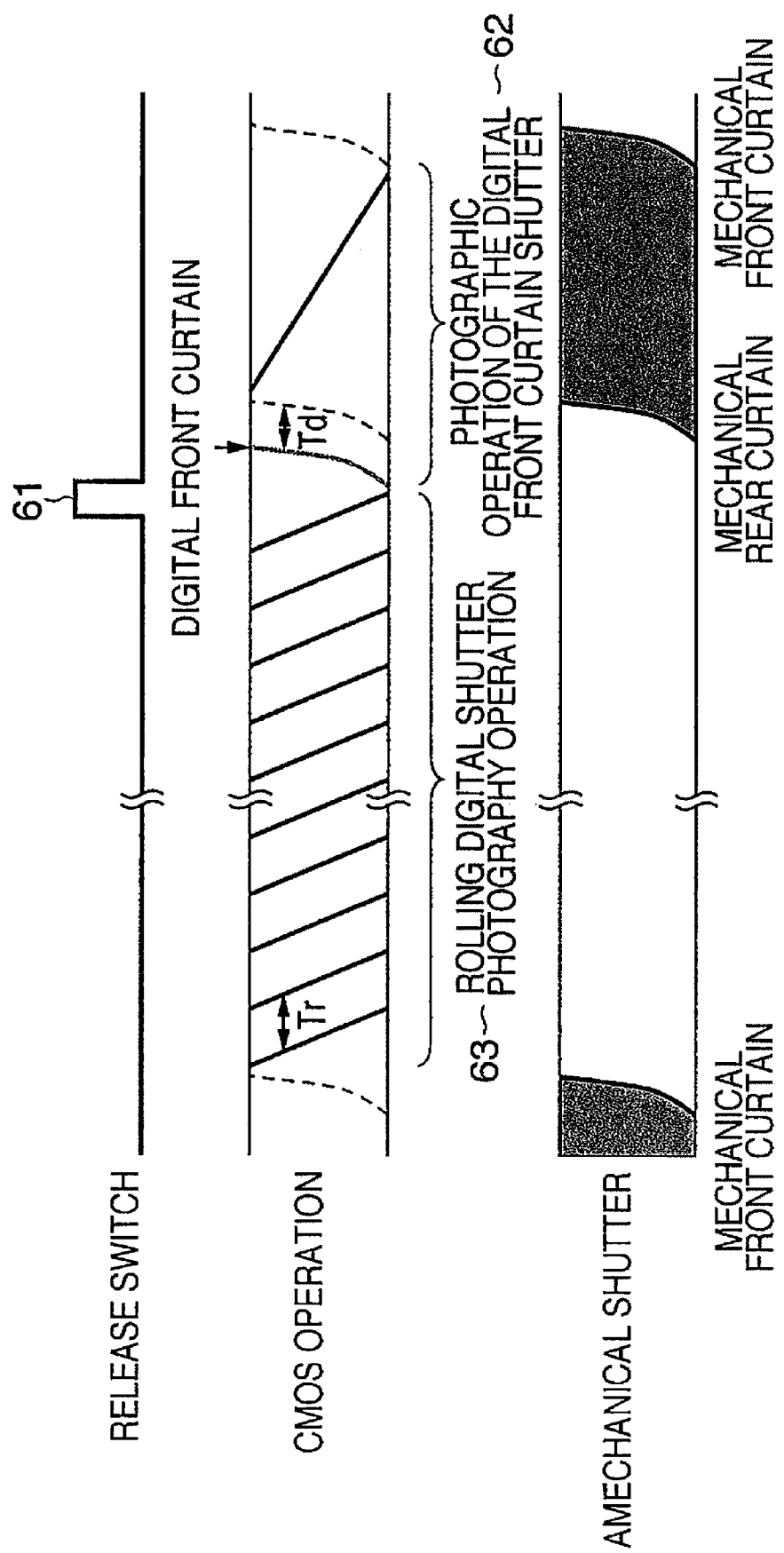
FIG. 10 illustrates a CMOS operation using an electronic front curtain shutter at a time of a photographic operation and a mechanical shutter operation, according to a preferred embodiment of the present invention.

FIG. 10 illustrates a CMOS operation using an electronic front curtain shutter at the time of the photographic operation and a mechanical shutter operation, according to a preferred embodiment of the present invention. A video image, such as an EVF, is displayed by a rolling electronic shutter photography operation 63 until a release switch 61 is operated and a photographic operation 62 of the electronic front curtain shutter is performed.

An image is photographed in the rolling electronic shutter photography operation 63 that is not affected by the mechanical shutter, because the shutter function is performed with the image capture element 205. Given, however, that the completion of the exposure is performed in the photographic operation 62 of the electronic front curtain shutter with a mechanical rear curtain, a possibility is present that the plurality of factors, such as the attitude of the camera, the temperature or the humidity of the environment wherein the camera is being used, the state of the power supply, the number of operations that have been performed, or the interval between one photograph being taken and the following photograph being taken, may have an impact upon a travel characteristic of the shutter blade unit of the mechanical rear curtain. A lack of uniformity of the exposure will arise as a consequence in the image that is photographed with the electronic front curtain shutter.

According to the embodiment, a pixel value of the image that is photographed with the rolling electronic shutter (hereinafter "the rolling electronic shutter image") is compared with a pixel value of the image that is photographed with the electronic front curtain shutter (hereinafter "the electronic front curtain shutter image"). The control circuit 209 performs the gain correction on the image data that is obtained at the time in question by the photography of the electronic front curtain shutter, in response to a result of the comparison.

The following is a description of a concrete sequence of creating a correction value. Each respective pixel value of an image, such as a brightness value, for example, is first normalized with each respective exposure time, because it is possible that the exposure time of the electronic front curtain shutter may differ from the exposure time of the rolling electronic shutter. A ratio of the pixel value of the image that is photographed with the electronic front curtain shutter that is thus normalized and the pixel value of the rolling electronic shutter image that is similarly compensated is computed, and a reciprocal of the ratio thus computed is treated as the correction value.

FIG. 11 schematically illustrates the gain correction according to the preferred embodiment of the present invention. To begin with, the control circuit 209 reads out the electronic front curtain shutter image and the rolling electronic shutter image, respectively, from the memory unit 208, and divides each respective image into a number of blocks of m+1 rows and an n+1 columns, where m is a nonnegative integer. In the present circumstance, a block of the electronic front curtain shutter image will be referred to as "Rmn," and a block of the rolling electronic shutter image will be referred to as "Dmn." The control circuit 209 then derives, for each respective block that is within a given column position, a ratio of a value that divides the pixel value of the electronic front curtain shutter image by an exposure time Td of the electronic front curtain shutter image, and a value that divides the pixel value of the rolling electronic shutter image by an exposure time Tr of the rolling electronic shutter image. A reciprocal of the ratio thus computed is treated as a correction value "Gmn." Assume, for example, that the control circuit 209 divides the pixel value of Rmn by the exposure time Td, and the pixel value of Dmn by the exposure time Tr, and takes the ratio of the respective dividends, for a block in the first row and the first column, that is, where m=0, and n=0. The control circuit 209 then treats the reciprocal of the ratio thus computed as the correction value G00. In a similar fashion, the control circuit 209 divides the pixel value of Rmn by the exposure time Td, and the pixel value of Dmn by the exposure time Tr, and takes the ratio of the respective dividends, for a block in the mth row and the nth column. The control circuit 209 then treats the reciprocal of the ratio thus computed as a correction value Gmn. The process sequence for computing the correction value G00, . . . , Gmn is exemplary, and the computation thereof is not restricted to the foregoing process sequence.

Figure 12:
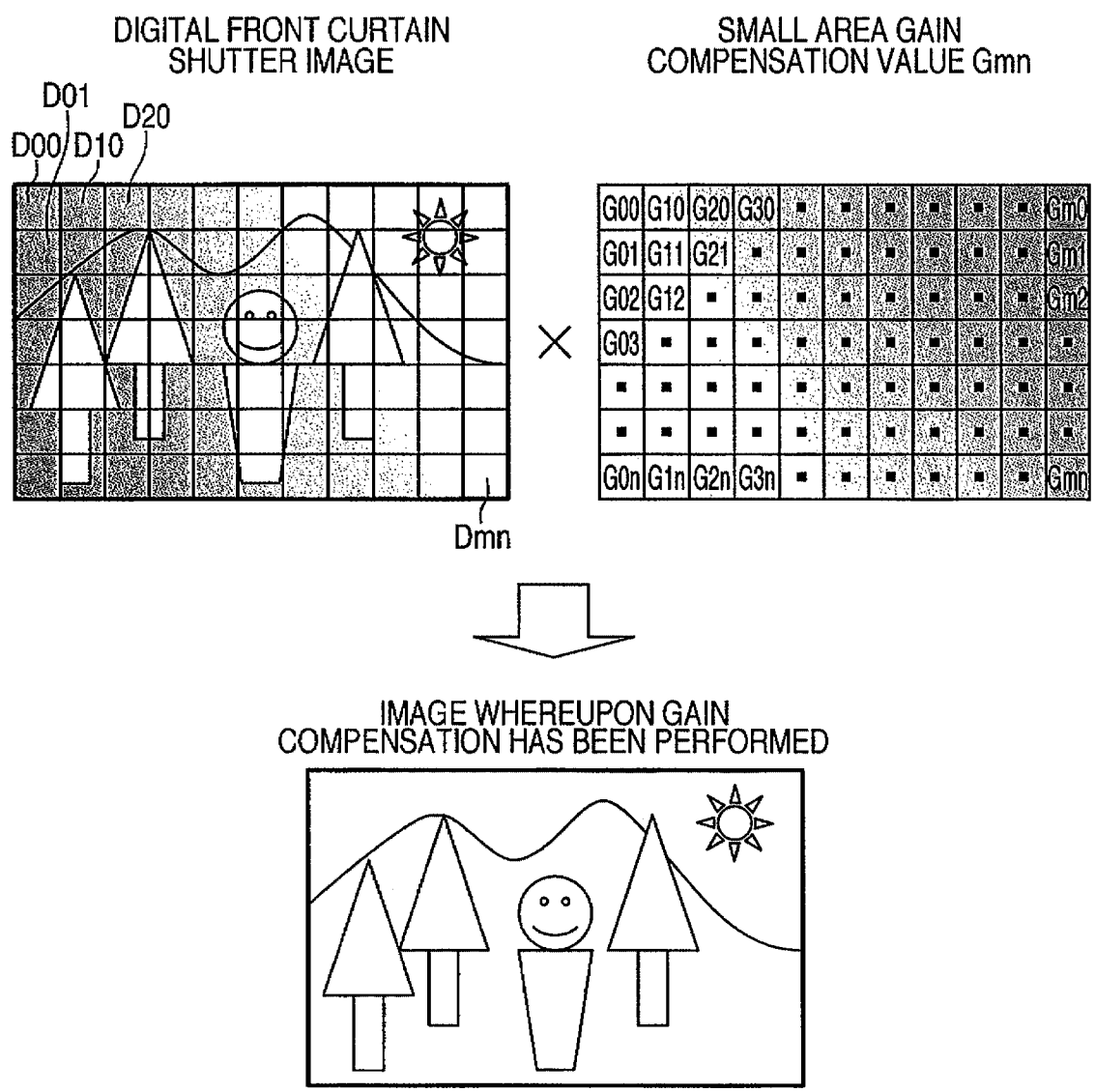
FIG. 12 schematically illustrates a process that employs a correction value that is computed in FIG. 11 to perform a gain correction of an image data.

FIG. 12 schematically illustrates a process that employs the correction value that is computed in FIG. 11 to perform a gain correction of an image data.

In the present circumstance, the control circuit 209 performs the gain correction by multiplying the correction value Gmn that is computed in FIG. 11 by the pixel value of each respective block Dmn of the electronic front curtain shutter image. The image data whereupon the gain correction has been performed is recorded on the recording medium 211 by way of the recording medium control interface unit 210. As a result, the gain correction is performed upon the pixel value of each respective block of the electronic front curtain shutter image, and an image is thereby obtained wherein the lack of uniformity in the exposure has been suppressed.

Whereas, according to the embodiment, the electronic front curtain shutter image and the rolling electronic shutter image are divided into blocks, and the gain correction is performed on a per block basis, the present invention is not restricted thereto, and it would be permissible to perform the gain correction on a per pixel basis. It would also be permissible to perform the gain correction selectively, on a portion of the pixel that is positioned within the image capture element 205.

Whereas, according to the embodiment, the gain correction was performed in a horizontal direction and a vertical direction, the present invention is not restricted thereto, and it would be permissible to perform the gain correction in either the horizontal direction or the vertical direction. The following is a description according to such an embodiment.

Figure 13:
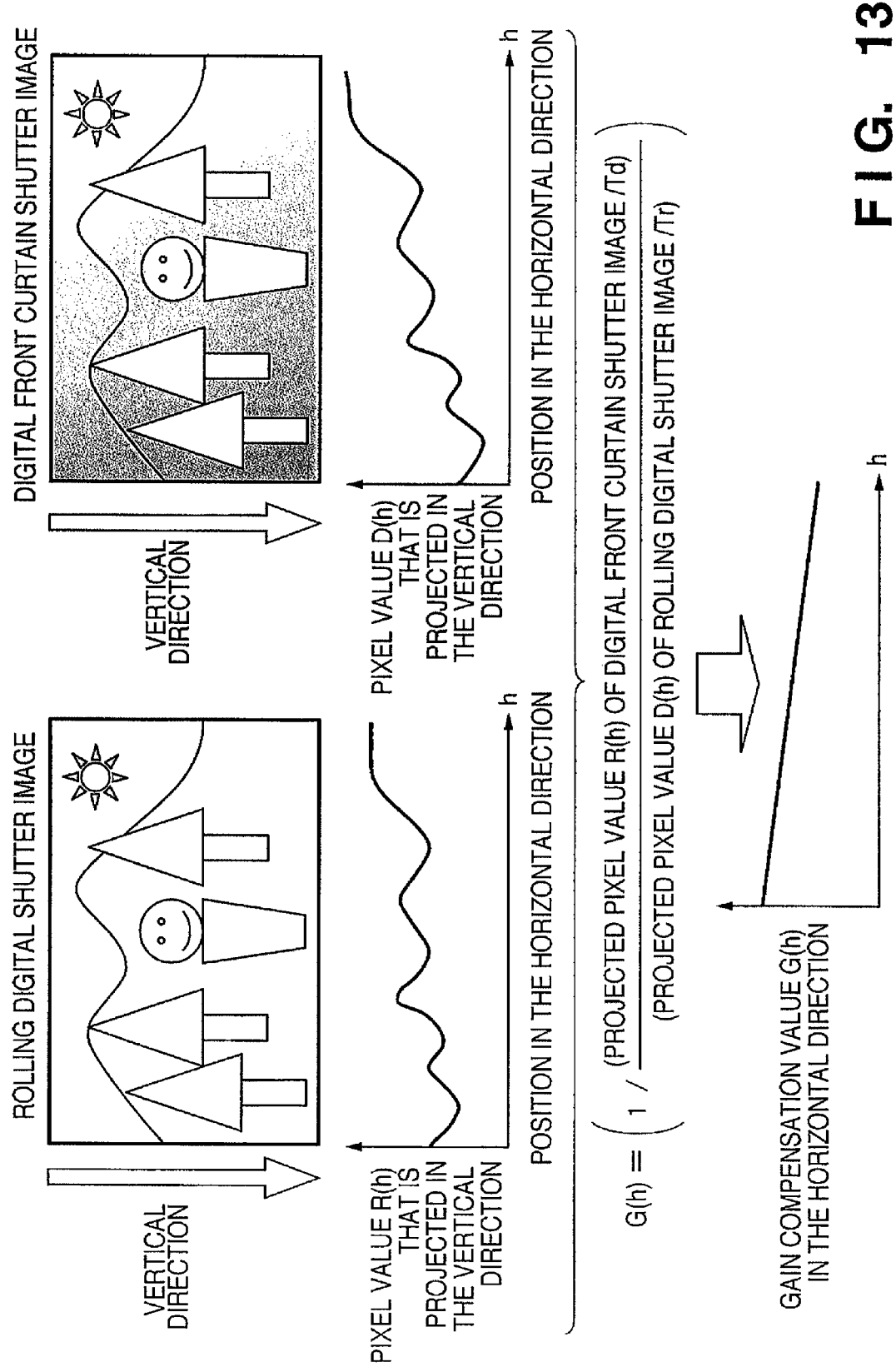
FIG. 13 schematically illustrates a process of computing a gain correction value in a horizontal direction, according to a preferred embodiment of the present invention.

FIG. 13 schematically illustrates a process of computing the gain correction value in the horizontal direction, according to a preferred embodiment of the present invention. To begin with, the control circuit 209 computes either a sum or an average value with regard to a pixel value on a per position basis of a horizontal direction of the rolling electronic shutter image, performs a projection process in a vertical direction of the rolling electronic shutter image, and derives a pixel value R(h) that is projected in the vertical direction. The control circuit 209 then computes either a sum or an average value with regard to a pixel value on a per position basis of a horizontal direction of the electronic front curtain shutter image, performs a projection process in a vertical direction of the electronic front curtain shutter image, and derives a pixel value D(h) that is projected in the vertical direction. The control circuit 209 then derives, on a per position h basis of the horizontal direction, a ratio of a value that divides the pixel value R(h) by an exposure time Tr of the rolling electronic shutter image, and a value that divides the pixel value D(h) by an exposure time Td of the electronic front curtain shutter image. A reciprocal of the ratio thus computed is treated as a correction value G(h).

Figure 14:
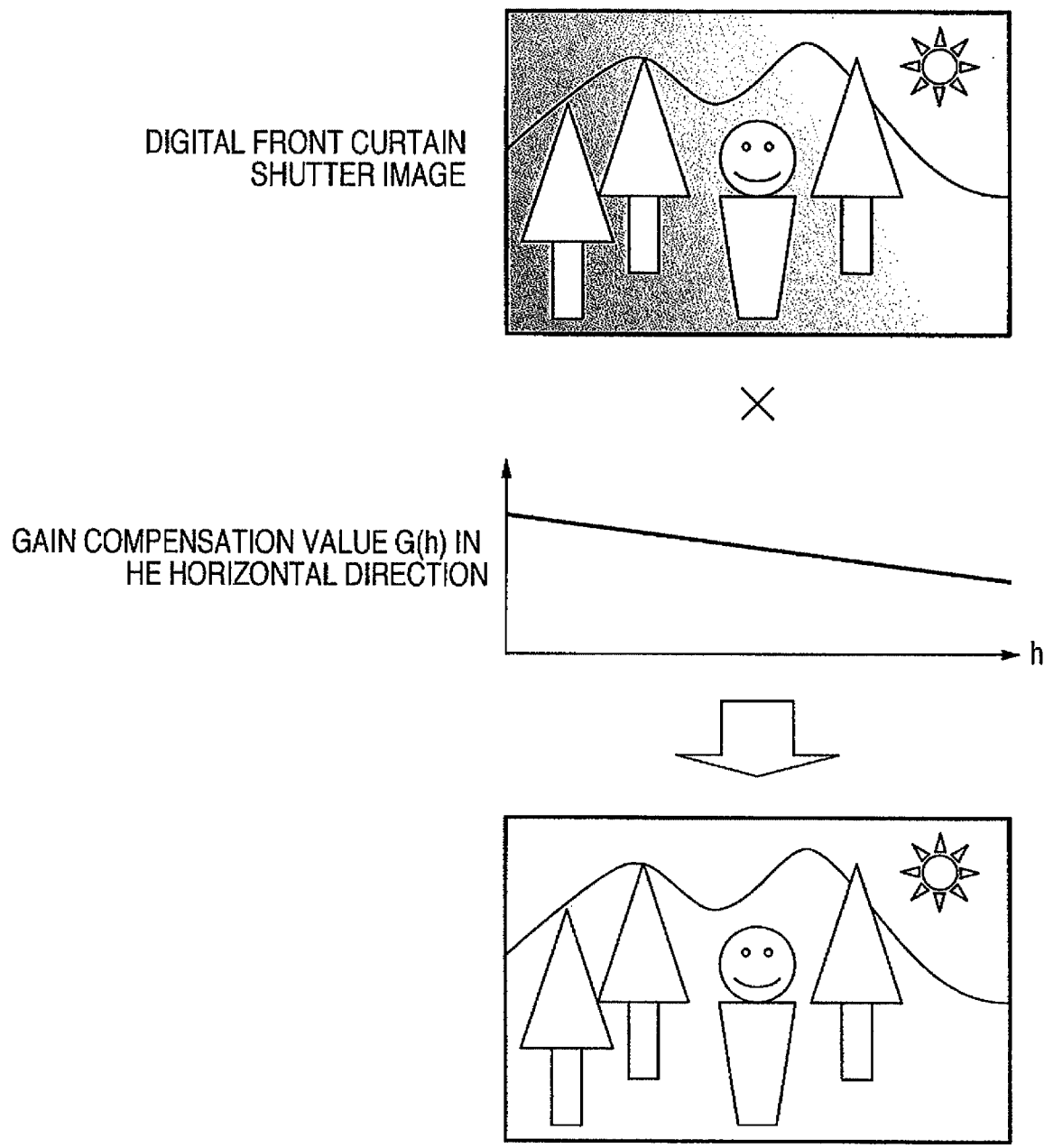
FIG. 14 employs the gain correction value in a horizontal direction that was derived in FIG. 13 to schematically illustrate a gain correction value with regard to a horizontal direction.

FIG. 14 employs the gain correction value G(h) in the horizontal direction that was derived in FIG. 13 to schematically illustrate the gain correction value with regard to the horizontal direction. In the present circumstance, the control circuit 209 multiplying the gain correction value G(h) in the horizontal direction that was computed as illustrated in FIG. 13 by the pixel value of the pixel at the position h in the horizontal direction of the electronic front curtain shutter image. In such a manner, the correction is performed upon the pixel value in the horizontal direction of the electronic front curtain shutter image, and an image is thereby obtained wherein the lack of uniformity in the exposure in the horizontal direction has been suppressed.

The image that is obtained by the photography of the electronic front curtain shutter in FIG. 14 becomes gradually lighter going from a left-hand side to a right-hand side of a screen. Performing a gain correction that causes a gradual weakening, however, from the strong left-hand side to the right-hand side, such as is illustrated in FIG. 14, allows obtaining an image wherein the lack of uniformity in the exposure has been suppressed.

Figure 15:
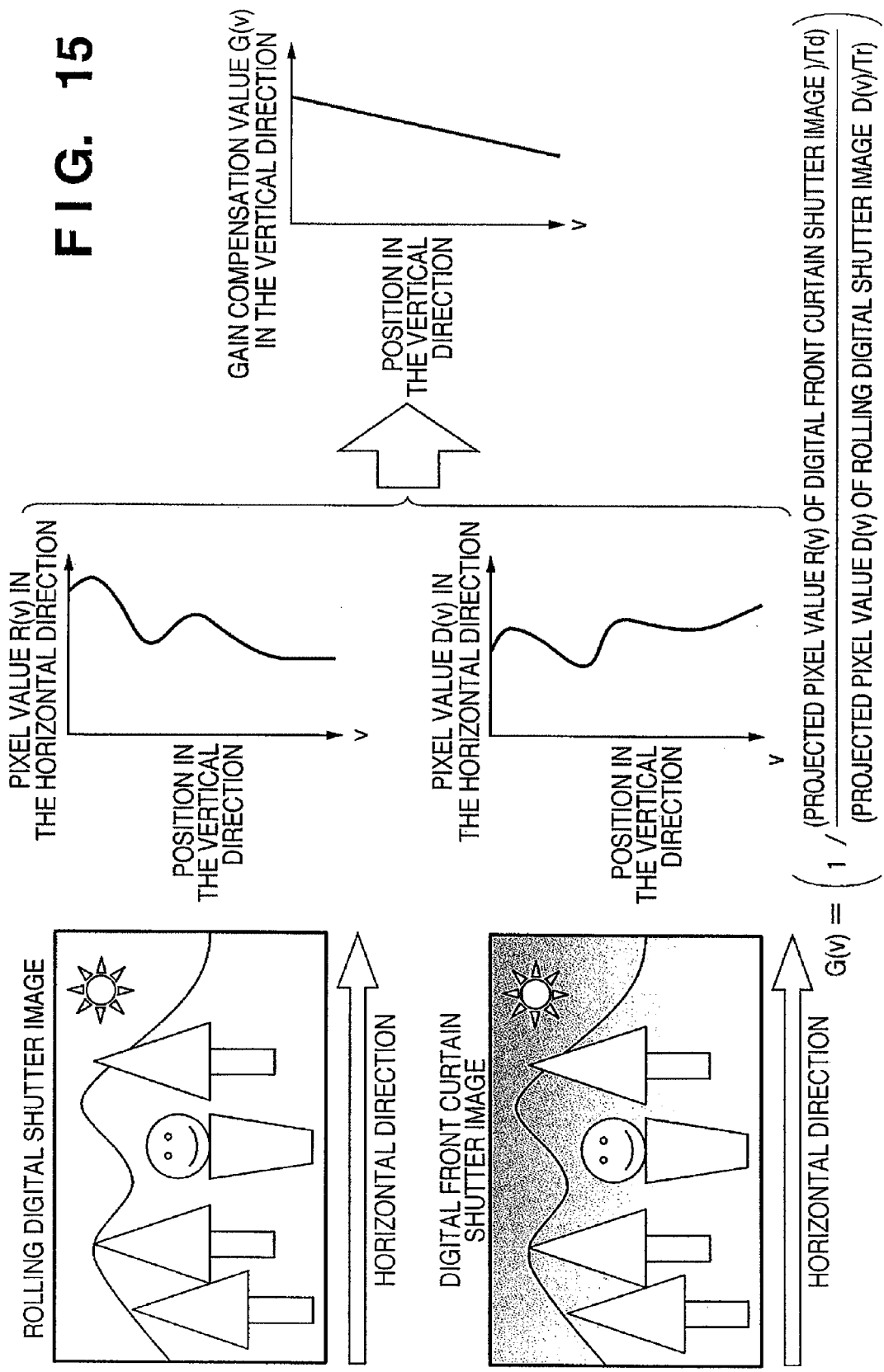
FIG. 15 schematically illustrates a process of computing a gain correction value in a vertical direction, according to a preferred embodiment of the present invention.

FIG. 15 schematically illustrates a process of computing a gain correction value in a vertical direction, according to a preferred embodiment of the present invention. To begin with, the control circuit 209 computes either a sum or an average value with regard to a pixel value on a per position basis of a vertical direction of the rolling electronic shutter image, performs a projection process in the horizontal direction of the rolling electronic shutter image, and derives a pixel value R(v) that is projected in the horizontal direction. The control circuit 209 then computes either a sum or an average value with regard to a pixel value on a per position basis of a vertical direction of the electronic front curtain shutter image, performs a projection process in a horizontal direction of the electronic front curtain shutter image, and derives a pixel value D(v) that is projected in the horizontal direction. The control circuit 209 then derives, on a per position v basis of the vertical direction, a ratio of a value that divides the pixel value R(v) by an exposure time Tr of the rolling electronic shutter image, and a value that divides the pixel value D(v) by an exposure time Td of the electronic front curtain shutter image. A reciprocal of the ratio thus computed is treated as a correction value G(v).

FIG. 16 employs the gain correction value G(v) in the vertical direction that was derived in FIG. 15 to schematically illustrate a gain correction value with regard to a vertical direction. In the present circumstance, the control circuit 209 multiplying the gain correction value G(v) in the vertical direction that was computed as illustrated in FIG. 15 by the pixel value of the pixel at the position v in the vertical direction of the electronic front curtain shutter image. In such a manner, the correction is performed upon the pixel value in the vertical direction of the electronic front curtain shutter image, and an image is thereby obtained wherein the lack of uniformity in the exposure in the vertical direction has been suppressed.

The image that is obtained by the photography of the electronic front curtain shutter in FIG. 16 becomes gradually lighter going from an upper part to a lower part of a screen. Performing a gain correction that causes a gradual weakening, however, from the strong upper to the lower, such as is illustrated in FIG. 16, allows obtaining an image wherein the lack of uniformity in the exposure has been suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-054889, filed Mar. 5, 2007 which is hereby incorporated by reference herein in its entirety.

What is claimed is:

1. An image capture apparatus, comprising:
   an image capture unit configured to photoelectrically convert an image of a subject and accumulate an electric charge therefrom, and output the electric charge thus accumulated as an image signal;
   a shutter unit configured to travel a shutter blade unit in a state wherein the shutter blade unit is retracted from a light path of an image capture unit to a state wherein the shutter blade unit is not retracted from the light path of the image capture unit;
   a first control unit configured to reset the electric charge on the image capture unit in the state wherein the shutter blade unit is retracted from the light path of the image capture unit, commence the accumulation of the electric charge after reset the electric charge on the image capture unit, and read out a first image signal from the image capture unit after a first accumulation time;
   a second control unit configured to:
   (i) reset the electric charge on the image capture unit in the state wherein the shutter blade unit is retracted from the light path of the image capture unit in coordination with a predetermined travel characteristic of the shutter blade unit after a first image signal is read out by said first control unit,
   (ii) commence the accumulation of the electric charge after the reset,
   (iii) after a second accumulation time, cause the shutter blade unit to travel to the state wherein the shutter blade unit is not retracted from the light path of the image capture unit, and
   (iv) read out a second image signal from an image capture unit; and
   a correction unit configured to correct the second image signal based on value obtained by computing a ratio between the first image signal and the second image signal,
   wherein the correction unit corrects the second image signal by dividing the first image signal and the second image signal respectively into blocks, computing the ratio between the first image signal and the second image signal for each respective corresponding block, and multiplying a result thereof by the second image signal with regard to the corresponding block.

2. The image capture apparatus according to claim 1, wherein:
   the image capture unit is an image capture unit of an X-Y address scheme.

3. An image capture apparatus comprising:
   an image capture unit configured to photoelectrically convert an image of a subject and accumulate an electric charge therefrom, and output the electric charge thus accumulated as an image signal;
   a shutter unit configured to travel a shutter blade unit in a state wherein the shutter blade unit is retracted from a light path of an image capture unit to a state wherein the shutter blade unit is not retracted from the light path of the image capture unit,
   a first control unit configured to reset the electric charge on the image capture unit in the state wherein the shutter blade unit is retracted from the light path of the image capture unit, commence the accumulation of the electric charge after reset the electric charge on the image capture unit, and read out a first image signal from the image capture unit after a first accumulation time;

a second control unit configured to:
(i) reset the electric charge on the image capture unit in the state wherein the shutter blade unit is retracted from the light path of the image capture unit in coordination with a predetermined travel characteristic of the shutter blade unit after a first image signal is read out by said first control unit,
(ii) commence the accumulation of the electric charge after the reset,
(iii) after a second accumulation time, cause the shutter blade unit to travel to the state wherein the shutter blade unit is not retracted from the light path of the image capture unit, and
(iv) read out a second image signal from an image capture unit; and a correction unit configured to correct the second image signal based on value obtained by computing a ratio between the first image signal and the second image signal, wherein the correction unit corrects the second image signal by computing a ratio between an image signal that is projection processed for a vertical direction of the first image signal and an image signal that is projection processed for a vertical direction of the second image signal, and multiplying a result thereof by the second image signal with regard to the corresponding vertical direction.

4. An image capture apparatus comprising:
an image capture unit configured to photoelectrically convert an image of a subject and accumulate an electric charge therefrom, and output the electric charge thus accumulated as an image signal;
a shutter unit configured to travel a shutter blade unit in a state wherein the shutter blade unit is retracted from a light path of an image capture unit to a state wherein the shutter blade unit is not retracted from the light path of the image capture unit;
a first control unit configured to reset the electric charge on the image capture unit in the state wherein the shutter blade unit is retracted from the light path of the image capture unit, commence the accumulation of the electric charge after reset the electric charge on the image capture unit, and read out a first image signal from the image capture unit after a first accumulation time;
a second control unit configured to:
(i) reset the electric charge on the image capture unit in the state wherein the shutter blade unit is retracted from the light path of the image capture unit in coordination with a predetermined travel characteristic of the shutter blade unit after a first image signal is read out by said first control unit,
(ii) commence the accumulation of the electric charge after the reset,
(iii) after a second accumulation time, cause the shutter blade unit to travel to the state wherein the shutter blade unit is not retracted from the light path of the image capture unit, and
(iv) read out a second image signal from an image capture unit; and
a correction unit configured to correct the second image signal based on value obtained by computing a ratio between the first image signal and the second image signal, wherein the correction unit corrects the second image signal by computing a ratio between an image signal that is projection processed for a horizontal direction of the first image signal and an image signal that is projection processed for a horizontal direction of the second image signal, and multiplying a result thereof by the second image signal with regard to the corresponding horizontal direction.

5. An image capture apparatus comprising:
an image capture unit configured to photoelectrically convert an image of a subject and accumulate an electric charge therefrom, and output the electric charge thus accumulated as an image signal;
a shutter unit configured to travel a shutter blade unit in a state wherein the shutter blade unit is retracted from a light path of an image capture unit to a state wherein the shutter blade unit is not retracted from the light path of the image capture unit;
a first control unit configured to reset the electric charge on the image capture unit in the state wherein the shutter blade unit is retracted from the light path of the image capture unit, commence the accumulation of the electric charge after reset the electric charge on the image capture unit, and read out a first image signal from the image capture unit after a first accumulation time;
a second control unit configured to:
(i) reset the electric charge on the image capture unit in the state wherein the shutter blade unit is retracted from the light path of the image capture unit in coordination with a predetermined travel characteristic of the shutter blade unit after a first image signal is read out by said first control unit,
(ii) commence the accumulation of the electric charge after the reset,
(iii) after a second accumulation time, cause the shutter blade unit to travel to the state wherein the shutter blade unit is not retracted from the light path of the image capture unit, and
(iv) read out a second image signal from an image capture unit; and
a correction unit configured to correct the second image signal based on value obtained by computing a ratio between the first image signal and the second image signal,
wherein the correction unit performs a calculation that divides the first image signal by the first accumulation time and that divides the second image signal by the second accumulation time, prior to computing the ratio between the first image signal and the second image signal.

6. A control method of an image capture apparatus, the image apparatus comprising an image capture unit configured to photoelectrically convert an image of a subject and accumulate an electric charge therefrom, and output the electric charge thus accumulated as an image signal, and a shutter unit configured to travel a shutter blade unit in a state wherein the shutter blade unit is retracted from a light path of an image capture unit to a state wherein the shutter blade unit is not retracted from the light path of the image capture unit, the control method of the image capture apparatus comprising the steps of:
resetting the electric charge on the image capture unit in the state wherein the shutter blade unit is retracted from the light path of the image capture unit, commencing the accumulation of the electric charge after reset the electric charge on the image capture unit, and reading out a first image signal from the image capture unit after a first accumulation time;

(i) resetting the electric charge on the image capture unit in the state wherein the shutter blade unit is retracted from the light path of the image capture unit in coordination with a predetermined travel characteristic of the shutter blade unit after a first image signal is read out by said first control unit, (ii) commencing the accumulation of the electric charge after the reset, (iii) after a second accumulation time, causing the shutter blade unit to travel to the state wherein the shutter blade unit is not retracted from the light path of the image capture, and (iv) reading out a second image signal from an image capture; and correcting the second image signal based on value obtained by computing a ratio between the first image signal and the second image signal, wherein the correction unit corrects the second image signal by dividing the first image signal and the second image signal respectively into blocks, computing the ratio between the first image signal and of the second image signal for each respective corresponding block, and multiplying a result thereof by the second image signal with regard to the corresponding block.

7. A control method of an image capture apparatus, the image apparatus comprising an image capture unit configured to photoelectrically convert an image of a subject and accumulate an electric charge therefrom, and output the electric charge thus accumulated as an image signal, and a shutter unit configured to travel a shutter blade unit in a state wherein the shutter blade unit is retracted from a light path of an image capture unit to a state wherein the shutter blade unit is not retracted from the light path of the image capture unit, the control method of the image capture apparatus comprising the steps of:

resetting the electric charge on the image capture unit in the state wherein the shutter blade unit is retracted from the light path of the image capture unit, commencing the accumulation of the electric charge after reset the electric charge on the image capture unit, and reading out a first image signal from the image capture unit after a first accumulation time;

(i) resetting the electric charge on the image capture unit in the state wherein the shutter blade unit is retracted from the light path of the image capture unit in coordination with a predetermined travel characteristic of the shutter blade unit after a first image signal is read out by said first control unit, (ii) commencing the accumulation of the electric charge after the reset, (iii) after a second accumulation time, causing the shutter blade unit to travel to the state wherein the shutter blade unit is not retracted from the light path of the image capture, and (iv) reading out a second image signal from an image capture; and correcting the second image signal based on value obtained by computing a ratio between the first image signal and the second image signal, wherein the correction unit corrects the second image signal by computing a ratio between an image signal that is projection processed for a vertical direction of the first image signal and an image signal that is projection processed for a vertical direction of the second image signal, and multiplying a result thereof by the second image signal with regard to the corresponding vertical direction.

8. A control method of an image capture apparatus, the image apparatus comprising an image capture unit configured to photoelectrically convert an image of a subject and accumulate an electric charge therefrom, and output the electric charge thus accumulated as an image signal, and a shutter unit configured to travel a shutter blade unit in a state wherein the shutter blade unit is retracted from a light path of an image capture unit to a state wherein the shutter blade unit is not retracted from the light path of the image capture unit, the control method of the image capture apparatus comprising the steps of:

resetting the electric charge on the image capture unit in the state wherein the shutter blade unit is retracted from the light path of the image capture unit, commencing the accumulation of the electric charge after reset the electric charge on the image capture unit, and reading out a first image signal from the image capture unit after a first accumulation time;

(i) resetting the electric charge on the image capture unit in the state wherein the shutter blade unit is retracted from the light path of the image capture unit in coordination with a predetermined travel characteristic of the shutter blade unit after a first image signal is read out by said first control unit, (ii) commencing the accumulation of the electric charge after the reset, (iii) after a second accumulation time, causing the shutter blade unit to travel to the state wherein the shutter blade unit is not retracted from the light path of the image capture, and (iv) reading out a second image signal from an image capture; and correcting the second image signal based on value obtained by computing a ratio between the first image signal and the second image signal, wherein the correction unit corrects the second image signal by computing a ratio between an image signal that is projection processed for a horizontal direction of the first image signal and an image signal that is projection processed for a horizontal direction of the second image signal, and multiplying a result thereof by the second image signal with regard to the corresponding horizontal direction.

9. A control method of an image capture apparatus, the image apparatus comprising an image capture unit configured to photoelectrically convert an image of a subject and accumulate an electric charge therefrom, and output the electric charge thus accumulated as an image signal, and a shutter unit configured to travel a shutter blade unit in a state wherein the shutter blade unit is retracted from a light path of an image capture unit to a state wherein the shutter blade unit is not retracted from the light path of the image capture unit, the control method of the image capture apparatus comprising the steps of:

resetting the electric charge on the image capture unit in the state wherein the shutter blade unit is retracted from the light path of the image capture unit, commencing the accumulation of the electric charge after reset the electric charge on the image capture unit, and reading out a first image signal from the image capture unit after a first accumulation time;

(i) resetting the electric charge on the image capture unit in the state wherein the shutter blade unit is retracted from the light path of the image capture unit in coordination with a predetermined travel characteristic of the shutter blade unit after a first image signal is read out by said first control unit, (ii) commencing the accumulation of the electric charge after the reset, (iii) after a second accumulation time, causing the shutter blade unit to travel to the state wherein the shutter blade unit is not retracted from the light path of the image capture, and (iv) reading out a second image signal from an image capture; and
correcting the second image signal based on value obtained by computing a ratio between the first image signal and the second image signal,
wherein the correction unit performs a calculation that divides the first image signal by the first accumulation time and that divides the second image signal by the second accumulation time, prior to computing the ratio between the first image signal and the second image signal.

* * * * *